United States Patent
Kobayashi

(10) Patent No.: US 9,064,445 B2
(45) Date of Patent: Jun. 23, 2015

(54) TRANSMISSION TYPE DISPLAY DEVICE, DISPLAY METHOD AND DISPLAY PROGRAM

(71) Applicant: Seiko Epson Corporation, Tokyo (JP)

(72) Inventor: Shinichi Kobayashi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 197 days.

(21) Appl. No.: 13/707,005

(22) Filed: Dec. 6, 2012

(65) Prior Publication Data

US 2013/0147859 A1 Jun. 13, 2013

(30) Foreign Application Priority Data

Dec. 12, 2011 (JP) ................................ 2011-270965

(51) Int. Cl.
- *G09G 5/00* (2006.01)
- *G09G 5/10* (2006.01)
- *G02B 27/01* (2006.01)
- *H04N 13/04* (2006.01)

(52) U.S. Cl.
CPC .............. *G09G 5/10* (2013.01); *H04N 13/0429* (2013.01); *G09G 2320/0276* (2013.01); *G09G 2320/0626* (2013.01); *G09G 2320/0633* (2013.01); *G09G 2330/021* (2013.01); *G09G 2360/144* (2013.01); *G02B 27/017* (2013.01); *G02B 2027/0178* (2013.01); *G02B 2027/0118* (2013.01); *G02B 2027/014* (2013.01)

(58) Field of Classification Search
CPC .......... H04N 13/0429; H04N 13/0431; H04N 13/0434; G09G 5/10; G09G 2360/144
USPC .............................................. 345/7
See application file for complete search history.

(56) References Cited

U.S. PATENT DOCUMENTS

| | | | | |
|---|---|---|---|---|
| 5,886,822 A * | 3/1999 | Spitzer | ................... | 359/630 |
| 2004/0104883 A1 * | 6/2004 | Drader | ................... | 345/102 |
| 2004/0130556 A1 * | 7/2004 | Nokiyama | ................... | 345/617 |
| 2007/0222730 A1 * | 9/2007 | Kao et al. | ................... | 345/89 |
| 2008/0186393 A1 * | 8/2008 | Lee et al. | ................... | 348/301 |
| 2010/0045908 A1 * | 2/2010 | Woo | ................... | 349/116 |
| 2010/0060551 A1 | 3/2010 | Sugiyama et al. | | |
| 2010/0103078 A1 | 4/2010 | Mukawa et al. | | |

FOREIGN PATENT DOCUMENTS

| | | |
|---|---|---|
| JP | 7-325265 A | 2/1995 |
| JP | 8-136883 A | 5/1996 |
| JP | 2008-20770 A | 1/2008 |
| JP | 4055283 B | 3/2008 |

* cited by examiner

*Primary Examiner* — Andrew Sasinowski
*Assistant Examiner* — Mihir Rayan
(74) *Attorney, Agent, or Firm* — ALG Intellectual Property, LLC

(57) ABSTRACT

A transmission type display device includes an image formation unit that forms an image of image light, a display unit that transmits ambient light to an image extraction area, and a control unit that determines a first mode in which alight intensity determination value that is a value for determining a light intensity of an image formed by the image formation unit is fixed, and a second mode in which the light intensity determination value is variably set, wherein in the first mode, the control unit fixes the light intensity determination value, and controls the transmittance of the shade, and wherein in the second mode, the control unit variably sets the light intensity determination value, and controls the transmittance of the shade.

7 Claims, 11 Drawing Sheets

TRANSMISSION TYPE DISPLAY DEVICE, DISPLAY METHOD AND DISPLAY PROGRAM

BACKGROUND

1. Technical Field

The present invention relates to a transmission type (see-through type) display device, a display method and a display program.

2. Related Art

JP-A-8-136883 discloses electronic sunglasses in which a perspective unit to see through is formed by a transmission type liquid crystal display member, so as to adjust the amount of light permeability of the transmission type liquid crystal display member corresponding to the amount of light outside (refer to JP-A-8-136883).

However, the electronic sunglasses disclosed in Patent Literature 1 are not a head mounted display (HMD) device, and have not considered a backlight (BL) or the like. Therefore, in such a device as the head mount display, with respect to the control of transmittance of shade, further development has been required.

SUMMARY

An advantage of some aspects of the invention is to provide a transmission type display device, a display method and a display program that are capable of performing satisfactory control of transmittance of shade.

An aspect of the invention is directed to a transmission type display device that includes a display unit that transmits ambient light to an image extraction area, so as to output image light from the image formation unit to the image extraction area, and changes a light level of the ambient light with a transmittance that is set by a shade in which a transmittance of light is a variable so as to pass the light to the image extraction area, wherein in the first mode, the control unit fixes the light intensity determination value, and controls the transmittance of the shade, and wherein in the second mode, the control unit variably sets the light intensity determination value, and controls the transmittance of the shade.

With this configuration, the control unit determines the first mode in which the light intensity determination value that is a value for determining the light intensity of an image formed by the image formation unit is fixed, and the second mode in which the light intensity determination value is variably set. In the first mode, the light intensity determination value is fixed, and a transmittance of shade is controlled. In the second mode, the light intensity determination value is variably set, and the transmittance of the shade is controlled. In this manner, the transmission type display device can perform satisfactory control of the transmittance of the shade. Further, the transmission type display device, for example, appropriately uses the first mode in which the light intensity determination value is fixed, and a second mode in which the light intensity determination value is variably set, such that it is possible to reduce the power consumption.

Another aspect of the invention is directed to the transmission type display device described above, which further includes a sensor that detects one or both of the level of the ambient light, and the level of the transmitted light passing through the shade, wherein in the first mode, the control unit fixes the light intensity determination value, and controls the transmittance of the shade based on a detection result by the sensor, and wherein in the second mode, the control unit variably sets the light intensity determination value, and controls the transmittance of the shade and the light intensity determination value based on a detection result by the sensor.

With this configuration, in the first mode, the control unit fixes the light intensity determination value, and based on the detection result by the sensor, controls the transmittance of the shade, and in the second mode, the control unit variably sets the light intensity determination value, and based on the detection result by the sensor, controls the transmittance of the shade and the light intensity determination value. In this manner, the transmission type display device can perform satisfactory control of the transmittance of the shade. The transmission type display device, for example, based on one or both of transmission light that have passed light level and shade from the outside, can control the transmittance of the shade.

Still another aspect of the invention is directed to the transmission type display device described above, which further includes a power, wherein the control unit detects a remaining capacity of power, and based on the detected remaining capacity of power, by a predetermined determination method, in a case where the remaining capacity of the power is determined to be small, the control unit determines the first mode, and in a case where the remaining capacity of the power is determined to be large, the control unit determines the second mode.

With this configuration, the control unit detects a remaining capacity of a power, and based on the detected remaining capacity of power, by a predetermined determination method, in a case where the remaining capacity of the power is determined to be small, the control unit determines the first mode, and in a case where the remaining capacity of the power is determined to be large, the control unit determines the second mode. In this manner, a transmission type display device can perform satisfactory control of transmittance of shade. Transmission type display device, for example, can reduce the power consumption corresponding to the remaining capacity of the power.

Yet another aspect of the invention is directed to the transmission type display device described above, wherein the control unit further controls a gamma value in the first mode and the second mode.

With the configuration, wherein the control unit further controls a gamma value in the first mode and the second mode. In this manner, a transmission type display device can perform satisfactory control of the transmittance of the shade. Further, the transmission type display device, for example, can appropriately control a gamma value.

Still yet another aspect of the invention is directed to the transmission type display device described above, wherein a value of light source brightness for a display element is used as a light intensity determination value that is a value for determining light intensity of an image formed by the image formation unit.

With this configuration, a control unit determines a first mode in which a value of light source brightness for a display element is fixed, and a second mode in which a value of light source brightness for a display element is set as a variable. In the first mode, the value of light source brightness for a display element is fixed, and a transmittance of shade is controlled. In the second mode, the value of light source brightness for a display element is put to be the variable, and the transmittance of the shade is controlled. In this manner, a transmission type display device can perform satisfactory control of the transmittance of the shade. Further, a transmission type display device, for example, appropriately uses the first mode a value of light source brightness for a display element is fixed, and a second mode in which a value of light source brightness for a display element is set as the variable, such that it is possible to reduce the power consumption.

Further another aspect of the invention is directed to the transmission type display device described above, wherein a display unit is provided to a display device mounted on the head of the user, wherein the display unit includes, a display element, a projection lens that projects an image light from the display element, and a light guide unit that guides the image light from the projection lens fixed to the projection lens to the image extraction area, and wherein the display unit is configured such that an image of the image light from the display element and an image of the ambient light can be observed at the same time through the light guide unit, wherein the image formation unit includes the display element that generates the image, and a light source that emits the image light representing the image generated by the display element, wherein the control unit optimizes the control of the light intensity determination value, by adjusting a brightness of the image formation unit to change the value of the light source brightness stepwise, changing the transmittance of the shade stepwise, and combining the control of the light source brightness and the control of the transmittance of the shade.

With this configuration, the control unit determines the first mode in which the light intensity determination value that is a value for determining the light intensity of an image formed by the image formation unit is fixed, and the second mode in which the light intensity determination value is variably set. In the first mode, the light intensity determination value is fixed, and a transmittance of shade is controlled. In the second mode, the light intensity determination value is variably set, and the transmittance of the shade is controlled. In this manner, a transmission type display device can perform satisfactory control of transmittance of shade. Further, a transmission type display device, for example, appropriately uses the first mode in which a light intensity determination value, and a second mode in which the light intensity determination value is set as the variable, such that it is possible to reduce power consumption.

Still further another aspect of the invention is directed to a display method of a transmission type display device including causing light from the outside to be transmitted to an image extraction area by a display unit, forming an image of an image light output to the image extraction area by an image formation unit, causing the formed image light to be output to the image extraction area, causing light level from the outside to be changed with the transmittance of light that is set by shade in which transmittance of light is a variable, and determining a first mode in which a light intensity determination value that is a value determining light intensity of an image formed by the image formation unit is fixed, and a second mode the light intensity determination value is set as a variable by a control unit, wherein in the first mode the light intensity determination value is fixed, and a transmittance of the shade is controlled, and in the second mode the light intensity determination value is set as a variable, and the transmittance of the shade is controlled.

With this method, a control unit determines the first mode in which a light intensity determination value that is a value determining light intensity of an image formed by the image formation unit is fixed, and the second mode in which the light intensity determination value is set as a variable, in the first mode, the light intensity determination value is fixed, a transmittance of shade is controlled, in the second mode, the light intensity determination value is put to be the variable, the transmittance of the shade is controlled. In this manner, a transmission type display device can perform satisfactory control of transmittance of shade. Further, a transmission type display device, for example, appropriately uses the first mode in which a light intensity determination value is fixed, and the second mode in which the light intensity determination value is set as the variable, such that it is possible to reduce the power consumption.

Yet further another aspect of the invention is directed to a display program for a transmission type display device, the program causing a computer to execute a procedure in which, with respect to a display unit causing light from the outside to be transmitted to an image extraction area, forming an image of image light to output to the image extraction area by an image formation unit, outputting the formed image light to the image extraction area, and causing light level from the outside to be changed and transmitted to the image extraction area with a transmittance that is set by a shade in which a transmittance of light is a variable, a control unit determines a first mode in which a light intensity determination value that is a value determining a light intensity of an image that is formed by the image formation unit is fixed, and a second mode in which the light intensity determination value is set as a variable, wherein in the first mode, the light intensity determination value is fixed, and the transmittance of the shade is controlled, and in the second mode, the light intensity determination value is set as a variable to control the transmittance of the shade.

With this program, a control unit determines the first mode in which a light intensity determination value that is a value determining light intensity of an image formed by the image formation unit is fixed, and the second mode in which the light intensity determination value is set as a variable, wherein in the first mode the light intensity determination value is fixed, and a transmittance of the shade is controlled, and in the second mode includes the light intensity determination value is set as a variable, and the transmittance of the shade is controlled. In this manner, a transmission type display device can perform satisfactory control of the transmittance of the shade. Further, a transmission type display device, for example, appropriately uses the first mode in which a light intensity determination value is fixed, and the second mode in which the light intensity determination value is set as the variable, such that it is possible to reduce the power consumption.

As described above, according to the aspects of the invention, the transmission type display device determines the first mode in which a light intensity determination value that is a value determining light intensity of an image formed by the image formation unit is fixed, and the second mode in which the light intensity determination value is set as a variable, wherein in the first mode the light intensity determination value is fixed, and a transmittance of the shade is controlled, and in the second mode the light intensity determination value is set as a variable, and the transmittance of the shade is controlled. In this manner, the transmission type display device can perform satisfactory control of the transmittance of the shade. Further, the transmission type display device, for example, appropriately uses the first mode in which alight intensity determination value is fixed, and the second mode in which the light intensity determination value is set as a variable, such that it is possible to reduce the power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
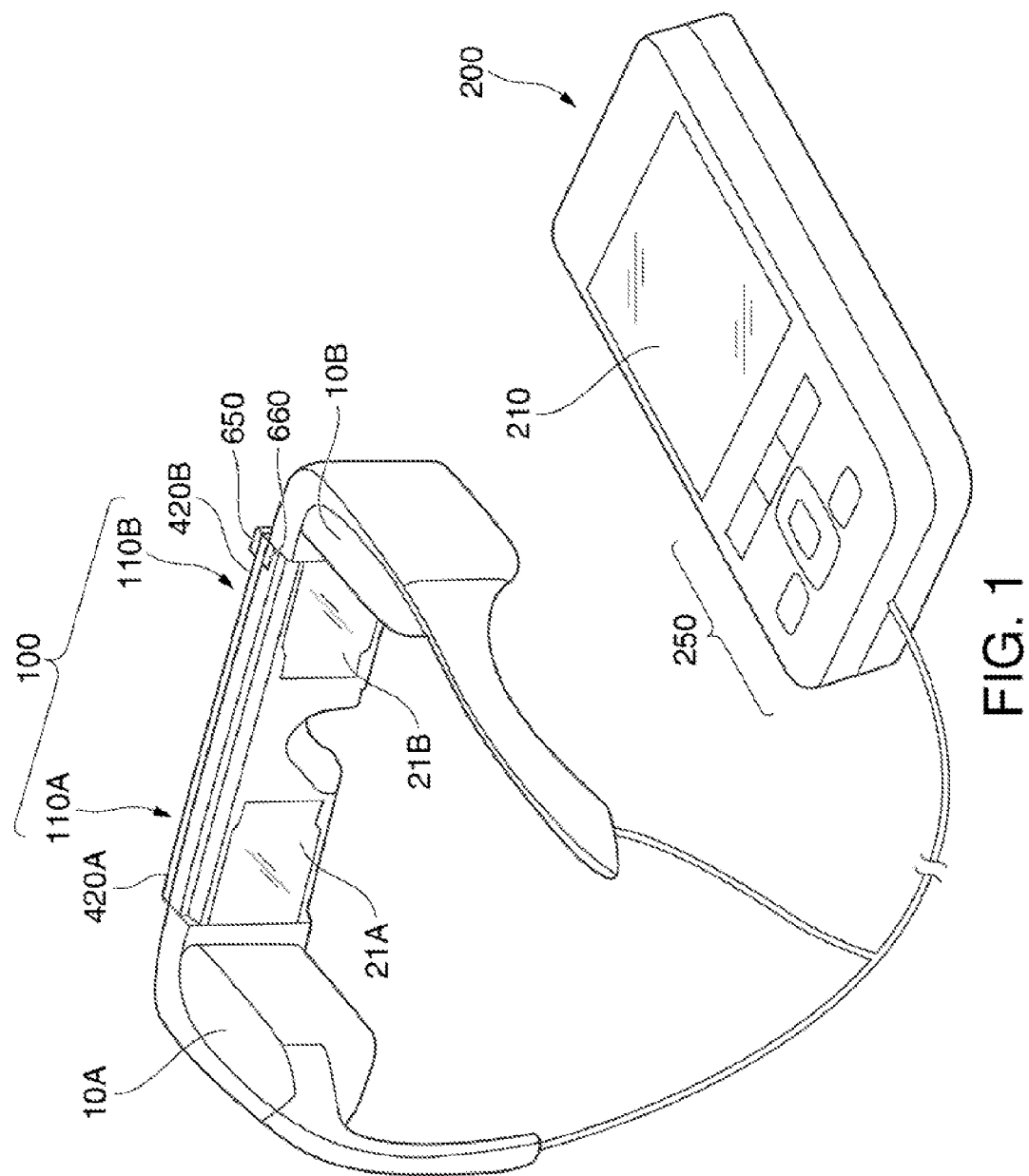
FIG. 1 is a diagram showing the appearance of a transmission type display device according to an embodiment of the invention.

An embodiment of the invention will be described in detail with reference to the drawings. FIG. 1 is a diagram showing the appearance of a transmission type display device according to the embodiment of the invention (in the present embodiment, a head mount display of transmission type). The transmission type display device according to the present embodiment includes a display device 100 having a shape such as eyeglasses, a control device (controller) 200 having a size that a user (human) is able to hold by hand.

Further, the display device 100 and the control device 200 are communicatively coupled by wire or wirelessly. In the present embodiment, each of the left eye side and right eye side of the display device 100 and the control device 200 are communicatively connected to a wired cable. Then, each of the left eye side and right eye side of the display device 100 and the control device 200 communicate with an image signal or control signal through the cable.

The display device 100 includes a display unit 110A for the left eye, a display unit 110B for the right eye, an ambient light sensor 650 that is provided on the right eye side, and a transmission light sensor 660 that is provided on the right eye side. The control device 200 includes a manipulation unit 210, and a manipulation button unit 250.

Figure 2:
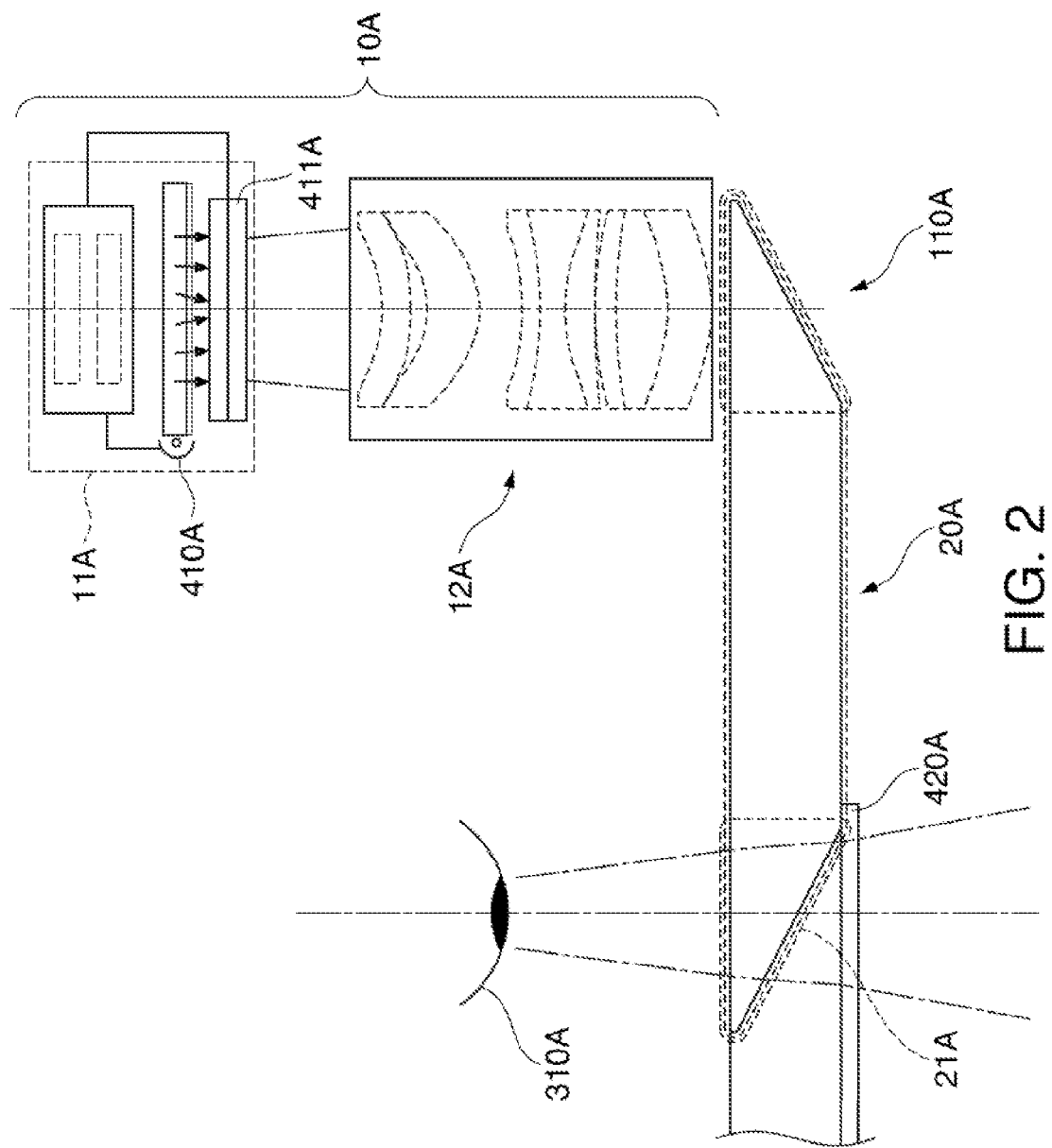
FIG. 2 is a plan view showing a configuration example of a left-eye display unit of the display device according to the embodiment of the invention.

The display unit 110A for the left eye includes an image formation unit 10A for the left eye, a light guide unit 20A for the left eye as shown in FIG. 2, a reflection unit 21A for the left eye, and a shade 420A for the left eye. The display unit 110B for the right eye includes an image formation unit 10B for the right eye, a light guide unit for the right eye that is the same as the light guide unit 20A for the left eye as shown in FIG. 2, a reflection unit 21B for the right eye, and a shade 420B for the right eye.

Here, the present embodiment shows a configuration that provides the ambient light sensor 650 and the transmission light sensor 660 on the side of right eye. However, as another configuration example, it is possible to provide one or both out of the ambient light sensor 650 and the transmission light sensor 660 on the left eye side. Further, as an another configuration example, it is possible to provide the ambient light sensor for the left eye and the transmission light sensor for the left eye on the side of left eye, and to provide the ambient light sensor for the right eye and the transmission light sensor for the right eye on the side of right eye.

FIG. 2 is a plan view showing a configuration example of the display unit 110A for the left eye for the display device 100 according to the embodiment of the invention. Further, FIG. 2 shows a left eye 310A of a user (human) who attaches the display device 100. In addition, with the exception of the ambient light sensor 650 and the transmission light sensor 660 that are provided on the right eye side in the present embodiment, the display unit 110A for the left eye and the display unit 110B for the right eye have a symmetrical configuration each other, here, it will be described with respect to the configuration of the display unit 110A for the left eye.

The image formation unit 10A for the left eye includes an image generation unit 11A for the left eye, and a projection optical system 12A for the left eye. The image generation unit 11A for the left eye includes a backlight light source 410A for the left eye, and a light modulation element 411A for the left eye.

The backlight light source 410A for the left eye is configured of a set of light sources of light emission color such as red, green, and blue in the present embodiment. As each light source, for example, a light emission diode (LED: Light Emitting Diode) can be used. In the present embodiment, the backlight light source 410A for the left eye is configured of the LED. As the light modulation element 411A for the left eye, for example, a liquid crystal display device can be used. In the present embodiment, the light modulation element 411A for the left eye is configured of the liquid crystal display (LCD).

With reference to FIGS. 1 and 2, the outline of the transmission display device will be described according to the present embodiment. In the image generation unit 11A for the left eye, the image signal for the left eye from the control device 200 is input. In the image generation unit 11A for the left eye, each light source of the backlight light source 410A for the left eye emits red light, green light and blue colored light. Further, the image generation unit 11A for the left eye diffuses red colored light, green light and blue light emitted from each light source of the backlight light source 410A for the left eye, and emits to the light modulation element 411A for the left eye. The light modulation element 411A for the left eye, in accordance with the image signal that is input to the image generation unit 11A for the left eye from the control device 200, spatially modulates the red light, green light and blue light that are projected. By doing so, an image light in accordance with the image signal is emitted. The projection optical system 12A for the left eye, for example, is configured of a group of a projection lens that emits the image light that is input, projects the image light that is emitted from the light modulation element 411A for the left eye of the image generation unit 11A for the left eye, and becomes the light beam of a parallel state.

A light guide unit 20A for the left eye emits the image light that has become the light beam of the parallel state by the projection optical system 12A for the left eye to a predetermined surface of a triangular prism (semi-transmission reflection surface) that a reflection unit 21A for the left eye has. Here, out of the front and back of the semi-transmission reflection surface that is formed in the reflection unit 21A for the left eye, a reflection coating such as a mirror layer is applied to the side facing a left eye 310A of the user when the display device is mounted. The image light that is projected to the semi-transmission reflection surface that is formed in the reflection unit 21A for the left eye is totally reflected in the direction of the left eye 310A of the user by a reflection coated surface. In this manner, an image light in accordance with the emitted image light is output to the area (image extraction area) of the predetermined position of the reflection unit 21A for the left eye.

In the present embodiment, the image light transmitted by a guide light plate of the guide light unit 20A for the left eye is reflected by the semi-transmission reflection surface that is formed in the reflection unit 21A for the left eye, the reflected light enters the left eye 310A of the user, in such a manner that a virtual image is formed on the retina of the left eye 310A. In addition, in the present embodiment, the light guide unit 20A for the left eye is fixed with respect to the projection optical system 12A for the left eye, and guides the image light from the projection optical system 12A for the left eye to a predetermined position.

Further, at least a portion of the light incident from the outside to the reflection unit 21A for the left eye transmits the above-mentioned semi-transmission reflection surface that is formed in the reflection unit 21A for the left eye, and is directed to the left eye 310A of the user. In this manner, it looks to the user that an image formed by the image formation unit 10A for the left eye and an optical image from the outside are superimposed. Further, a shade 420A for the left eye, in accordance with the transmittance, reduces a light incident on the reflection unit 21A for the left eye (toward the left eye 310A of the user) from the outside.

The user attaches the display device 100 to the head. By doing so, an image appears to be displayed in accordance with the image light that is output from an image extraction area of the display device 100 (image extraction area of the reflection unit 21A for the left eye, image extraction area of the reflection unit 21B for the right eye), such that it is possible for the user to recognize the image. Further, the user causes at least a portion of the light from the outside to be transmitted to the image extraction area of the display device 100 (image extraction area of the reflection unit 21A for the left eye, image extraction area of the reflection unit 21B for the right eye), such that it is possible for the user to see the outside while the display device 100 is attached on the head. That is, it is possible for the light from the outside to transmit the image extraction area (image extraction area of the reflection unit 21A for the left eye, image extraction area of the reflection unit 21B for the right eye). In this manner, it is possible for the user to see (observe) an image of a display target and an image of the outside by the transmission type display device at the same time through the light guide unit (light guide unit 20A for the left eye, light guide unit for the right eye that is similar to that), and possible to recognize a virtual image. Further, it is possible for the user to perform a manipulation input for the manipulation unit 210 of the control device 200 or the manipulation button unit 250.

Here, an image formation unit 10A for the left eye is provided in a temple unit on the left side of the display device 100 so as to be positioned on the left side of the user's head when it is put on. The image formation unit 10A for the left eye forms an image for the left eye of the user, outputs the light of an image that is formed to the direction of the predetermined position (position of the image extraction area) of the reflection unit 21A for the left eye. The image extraction area of the reflection unit 21A for the left eye is provided in a rim portion of the left side of the display device 100 in order to be positioned in front of the left eye 310A of the user when the display device 100 is mounted.

Further, an image formation unit 10B for the right eye is provided in a temple unit of the right side of the display device 100 so as to be positioned on the right side of the user's head unit when it is put on. The image formation unit 10B for the right eye forms an image for the right eye of the user, outputs the light of an image that is formed to the direction of the predetermined position (position of the image extraction area) of the reflection unit 21B for the right eye. The image extraction area of the reflection unit 21B for the right eye is provided in a rim portion of the right side of the display device 100 in order to be positioned in front of the right eye 310A of the user when the display device 100 is mounted.

Figure 3:
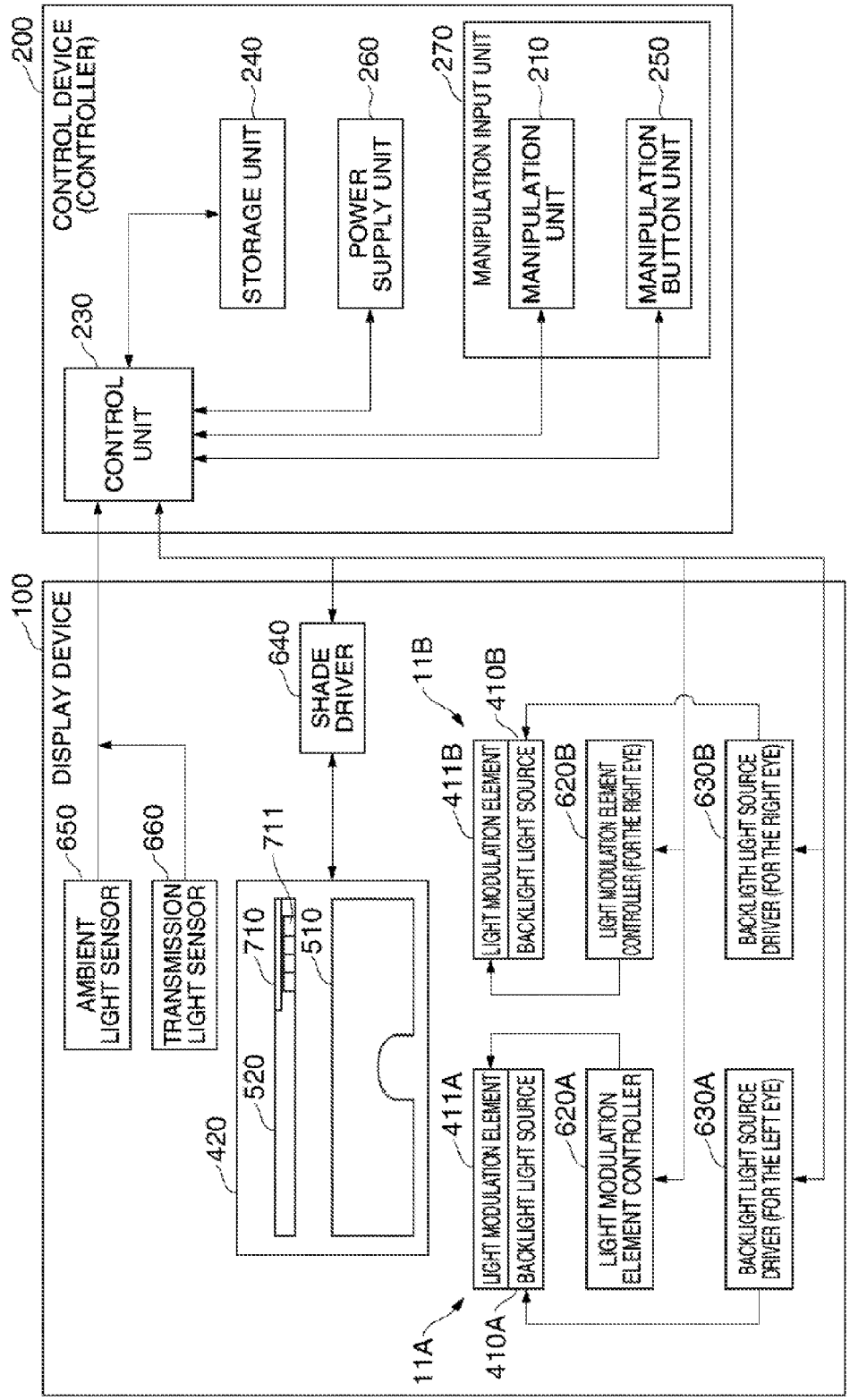
FIG. 3 is a block diagram schematically showing a configuration example of a transmission type display device according to the embodiment of the invention.

In the following, a transmission type display device according to the present embodiment will be described in more detail. FIG. 3 is a block diagram schematically showing a configuration example of the transmission type display device according to the embodiment of the invention. A control device 200 includes a manipulation unit 210, a manipulation button unit 250, a control unit 230, a storage unit 240, and a power supply unit 260. Further, the control device 200 is configured of a manipulation input unit 270 that receives a manipulation input from a user by one or both of the manipulation unit 210 and the manipulation button unit 250.

The display device 100 includes a backlight light source (backlight light source 410A for the left eye, backlight light source 410B for the right eye) and a light modulation element (light modulation element 411A for the left eye, light modulation element 411B for the right eye) that an image generation unit (an image generation unit 11A for the left eye, image generation unit 11B for the right eye) has, a shade unit 420 corresponding to a shade (shade 420A for the left eye, shade 420B for the right eye) that a display unit (display unit 110A for the left eye, display unit 110B for the right eye) has, an ambient light sensor 650, a transmission light sensor 660. In addition to these, a light modulation element controller 620A for the left eye, a light modulation element controller 620B for the right eye, a backlight light source driver 630A for the left eye, a backlight light source driver 630B for the right eye, and a shade driver 640 are provided.

Here, in FIG. 3, a schematic configuration example is shown, as shown in FIG. 2, with respect to a projection optical system (projection optical system 12A for the left eye, projection optical system for the right eye that is similar to that) that an image formation unit (image formation unit 10A for the left eye, image formation unit 10B for the right eye) has, a light guide unit (light guide unit 20A for the left eye, light guide unit 20B for the right eye that is similar to that), and a reflection unit (reflection unit 21A for the left eye, reflection unit 21B for the right eye), the illustration thereof is omitted.

Further, as shown in FIG. 3, a light modulation element controller (light modulation element controller 620A for the left eye, light modulation element controller 620B for the right eye), and a backlight light source driver (backlight light source driver 630A for the left eye, and backlight light source driver 630B for the right eye), for example, are provided in an image generation unit (image generation unit 11A for the left eye, image generation unit 11B for the right eye) for the left eye and right eye.

In the present embodiment, a LED is used as a backlight light source (backlight light source 410A for the left eye, backlight light source 410B for the right eye), an LED driver is used as a backlight light source driver (backlight light source driver 630A for the left eye, backlight light source driver 630B for the right eye). Further, in the present embodiment, a LCD is used as a light modulation element (light modulation element 411A for the left eye, light modulation element 411B for the right eye), as a light modulation element controller (light modulation element controller 620A for the left eye, light modulation element controller 620B for the right eye), a LCD controller is used.

Further, in a shade unit 420 of the present embodiment, a shade 420A for the left eye and a shade 420B for the right eye are configured as a body. In the shade unit 420 in FIG. 3, an appearance example in which an integrated shade is viewed in the direction of sight of the user for such a left and a right (appearance example of shade 510), and an appearance example viewed from the top (appearance example of shade 520) are shown. These two shades of appearance examples of shades 510,520 show a single shade of appearance example. Further, appearance example (appearance example of shade 520) viewed from the top shows electrodes 710, 711 for controlling a transmittance of the shade.

Further, as shown in FIG. 3, a shade driver 640 in the present embodiment is included in an image generation unit 11B for the right eye. In addition, in the present embodiment, the shade 420A for the left eye and the shade 420B for the right eye are configured as a unit. Therefore, single shade driver 640 is provided for the shade with the left and right integrated. However, as another configuration example, in a case where a shade 420A for the left eye and a shade 420B for the right eye are configured as a separate body, for example, a shade driver for the left eye and a shade driver for the right eye are provided. In this case, the shade driver for the left eye, for example, is provided in the image generation unit 11A for the left eye, further, the shade driver for the right eye, for example, is provided in the image generation unit 11B for the right eye.

Each configuration unit of the transmission type display device according to the present embodiment will be described. First, the display device 100 will be described. An image formation unit 10A for the left eye that is provided in the display unit 110A for the left eye, a light guide unit 20A for the left eye, a reflection unit 21A for the left eye, a shade 420A for the left eye (according to the present embodiment, shade unit 420 with the left and right integrated), an image generation unit 11A for the left eye that is provided in the image formation unit 10A for the left eye, a projection optical system 12A for the left eye, a backlight light source 410A for the left eye that is provided in the image generation unit 11A for the left eye, and a light modulation element 411A for the left eye include configuration as described with reference to FIGS. 1 and 2 and the operation thereof is performed.

Further, an image formation unit 10B for the right eye that is provided in the display unit 110B for the right eye, a light guide unit for the right eye, a reflection unit 21B for the right eye, a shade 420B for the right eye (according to the present embodiment, shade unit 420 with the left and right integrated), an image generation unit 11B for the right eye that is provided in the image formation unit 10B for the right eye, a projection optical system for the right eye, a backlight light source 410B for the right eye that is provided in an image generation unit 11B for the right eye, and a light modulation element 411B for the right eye perform an operation by having the same configuration as described with reference to FIGS. 1 and 2 for the left eye.

An ambient light sensor 650 detects a level of light from the outside (environmental light), and transmits the detected result to a control unit 230 of a control device 200. Here, as the level of the environmental light detected by the ambient light sensor 650, for example, the luminance level of the environmental light can be used. In addition, in the present embodiment, the ambient light sensor 650 is provided to the outside in the vicinity of the right end of the shade unit 420.

In the present embodiment, the ambient light sensor 650 is displaced so as to detect the environmental light of the same (or, about the same) direction with a shade from the outside (in the present embodiment, the shade 420B for the right eye) and an image extraction area (in the present embodiment, an image extraction area of the reflection unit 21B for the right eye). In this manner, the ambient light sensor 650 detects the level of the environmental light incident (further, a level in accordance with that) on the shade from the outside (in the present embodiment, a shade 420B for the right eye) and the image extraction area (in the present embodiment, the image extraction area of the reflection unit 21B for the right eye).

A transmission light sensor 660 detects a level of the light after the light (transmitted light) of the outside (environmental light) has passed through a shade (in the present embodiment, shade 420B for the right eye), and transmits the detection result to a control unit 230 of the control device 200. Here, as the level of the environmental light detected by the transmission light sensor 660, for example, in the same manner as the ambient light sensor 650, the luminance level of the light can be used. In addition, in the present embodiment, the transmission light sensor 660 is provided on the inside (eye side of the user) in the vicinity of the right edge of the shade unit 420. In this manner, the transmission light sensor 660, for example, through the shade in accordance with the transmittance of the shade, detects actually the level of the ambient light (environmental light) entering the eye of the user.

Further, for example, in the light detected by the transmission light sensor 660, in cases where it is preferred that the image light that is output to the image extraction area (image extraction area of reflection unit 21A for the left eye, image extraction area of reflection unit 21B for the right eye) be not included, it may be desirable that a member to block the light be provided in the side of the image light with respect to the transmission light sensor 660.

In addition, in the present embodiment, with respect to a shade unit 420 with the left and right integrated, single ambient light sensor 650 and single transmission light sensor 660 are provided. However, as another configuration example, it is possible to provide the ambient light sensor for the left eye and the transmission light sensor for the left eye, the ambient light sensor for the right eye and the transmission light sensor for the right eye as a separate body. In this case, the ambient light sensor for the left eye and the transmission light sensor for the left eye are provided for a shade 420A for the left eye, for example, the ambient light sensor for the left eye is provided to the outside in the vicinity of the left edge of the shade 420A for the left eye, further, the transmission light sensor for the left eye is provided on the inside (eye side of the user) in the left end vicinity of the shade 420A for the left eye. In the same manner, the ambient light sensor for the right eye and the transmission light sensor for the right eye are provided for the shade 420B for the right eye, for example, the ambient light sensor for the right eye is provided to the outside in the vicinity of the right edge of the shade 420B for the right eye, further, the transmission light sensor for the right is provided on the inside (eye side of the user) in the vicinity of the right edge of the shade 420B for the right eye.

Here, as a position to provide the ambient light sensor 650 and the transmission light sensor 660, respectively, various positions may be used. Further, with respect to a shade unit 420 with the left and right integrated, only one may be provided out of the right eye side and the left eye side for the ambient light sensor and the transmission light sensor, Or, both side may be provided between the left eye side and the right eye side. Further, as another configuration example, also in a case where a shade for the left eye and a shade for the right eye that are separate body from each other are used, only one side may be provided out of the right eye side and the left eye side for the ambient light sensor and the transmission light sensor, or both sides of the left eye and the right eye may be provided.

In a case where the ambient light sensor and the transmission light sensor is provided in one side out of the left eye side and the right eye side, for example, the result detected by the ambient light sensor and the result detected by the transmission light sensor are used as common information at the left eye side and the right eye side. Further, in the configuration using the shade unit 420 with the left and right integrated, with respect to each of the left eye side and the right eye side, as a separate body, in a case where the ambient light sensor and the transmission light sensor are provided, for example, there are information considered of one or both out of the result detected by the ambient light sensor of the left eye side and the result detected by the ambient light sensor of the right eye side, and the other information considered of one or both out of the result detected by the transmission light sensor of the left eye side and the result detected by the transmission light sensor of the right eye side, such that both of the information are used. Further, in the configuration using a shade unit for the left eye and a shade for the right eye in which the left and right are separate body from each other, with respect to each of the left eye side and the right eye side, as a separate body, in a case where the ambient light sensor and the transmission light sensor are provided, for example, the result detected by the ambient light sensor of the left eye side and the result detected by the transmission light sensor of the left eye side are used as information with respect to the shade for the left eye, and the result detected by the ambient light sensor of the right eye side and the result detected by the transmission light sensor of the right eye side are used as information with respect to the shade unit for the right eye.

A light modulation element controller 620A for the left eye is controlled by a control unit 230 of the control device 200, for example, so as to cause the image in accordance with an image signal for the left eye to be displayed, and controls a light modulation element 411A for the left eye. A light modulation element controller 620B for the right eye is controlled by a control unit 230 of the control device 200, for example, so as to cause the image in accordance with an image signal for the right eye to be displayed, and controls a light modulation element 411B for the right eye.

A backlight light source driver 630A for the left eye is controlled by a control unit 230 of the control device 200, and controls a backlight light source 410A for the left eye. A backlight light source driver 630B for the right eye is controlled by a control unit 230 of the control device 200, and controls a backlight light source 410B for the right eye.

A shade driver 640 is controlled by a control unit 230 of the control device 200, and controls a shade unit 420. In the present embodiment, a shade driver 640 is controlled by a control unit 230 of the control device 200, and controls the transmittance of a shade unit 420. In the present embodiment, a shade 420A for the left eye and a shade 420B for the right eye are integrated as a unit (shade unit 420), for both of these, the transmittance is controlled to the same value.

The transmittance of the shade unit 420 (shade 420A for the left eye, shade 420B for the right eye) is variable, and the transmittance thereof changes by the control from the outside (in the present embodiment, control from shade driver 640). More specifically, by controlling the voltage applied to the electrodes 710, 711 of the shade unit 420, it is possible to control the setting value of the shade transmittance. In addition, the shade unit 420 includes the electrodes 710, 711 in this manner, such that it is possible to communicate with the control unit 230, and possible to notify the control unit 230 of the state of the shade itself (in the present embodiment, transmittance). Here, the shade unit 420 (shade 420A for the left eye, shade 420B for the right eye) that can control the transmittance variably (freely) can be configured using, for example, such as a liquid crystal or electrochromic materials.

Next, the control device 200 will be described. A manipulation unit 210 detects a manipulation input for a manipulation surface that is provided in a housing of the control device 200, and outputs the detected result to the control unit 230. Here, the manipulation unit 210, for example, detects in absolute coordinates, the position on the manipulation surface on which the user's finger is touched by the manipulation input. The manipulation unit 210, for example, is a track pad.

A manipulation button unit 250 includes a plurality of manipulation buttons. By being pressed down by the user, each manipulation button outputs a signal showing the processing associated with the manipulation button that is pressed down in advance to the control unit 230.

A storage unit 240 is configured using, for example, EEPROM (Electrically Erasable Programmable Read-Only Memory) or the like, stores various types of information. More specifically, the storage unit 240 stores, for example, information of program that is executed by the control unit 230, or information used in the various type of processing.

A power supply unit 260 supplies each configuration unit that requires a power supply provided in the control device 200 and the display device 100 with a power supply. In the present embodiment, the power supply unit 260 uses battery. Here, as a configuration of the battery in the transmission type display device (display device 100 and control device 200), various types of configuration may be used. For example, the power supply unit 260 may be provided on the display device 100 instead of the control device 200, or the power supply unit may be provided to both of the control device 200 and the display device 100.

The control unit 230 executes various types of processing in the control device 200. The control unit 230 is configured using, for example, a CPU (Central Processing Unit) or the like.

More specifically, the control unit 230 includes, for example, a function to execute a processing in accordance with the detection result in a case where a detection result of a manipulation input from the manipulation unit 210 is input, a function to execute a processing in accordance with the signal in a case where a signal indicating a processing associated with a manipulation button that is pressed down in advance in a manipulation button unit 250 is input, a function to write information in the storage unit 240 and a function to readout information that is stored in a storage unit 240, and a function to control a state of supplying a power supply to each configuration unit from the power supply unit 260.

Further, the control unit 230 includes a function to detect the remaining capacity (in the present embodiment, referred to as battery capacity) of the power supply unit 260. Here, in the present embodiment, the control unit 230 detects all the remaining capacity of the power supply (remaining capacity of single power supply unit 260) in the transmission type display unit (display device 100 and control device 200). However, as another configuration example, if a plurality of power supply unit is provided, a configuration that detects the only remaining capacity of a part of power supply that is predetermined may be used.

Further, the control unit 230 includes, for example, a function to acquire a detection result of a level of an environmental light that is input from the ambient light sensor 650, and a function to acquire a detection result of a level of light (level of light after an environmental light has passed a shade (in the present embodiment, shade 420B for the right eye)) that is input from the transmission light sensor 660. In this manner, it is possible for the control unit 230 to perform a calculation in which information of the detection result is used.

Further, the control unit 230, with respect to the image for the user to cause it to be displayed according to the display device 100, for example, includes a function to output an image signal for the left eye to an image generation unit 11A for the left eye, and a function to output an image signal for the right eye to an image generation unit 11B for the right eye.

In the present embodiment, the control unit 230 outputs an image signal for the left eye to a light modulation element controller 620A for the left eye, and outputs an image signal for the right eye to a light modulation element controller 620B for the right eye.

Here, the image signal for the left eye and the image signal for the right eye caused to be displayed at the same time for the user, for example, may be the same image signal, or may be a different image signal in accordance with a parallax of the image.

Further, as an image displayed by the display device 100, a variety of image content may be used. More specifically, as an image displayed by the display device 100, for example, it is possible to use an image content of video such as movies or the like. For example, with respect to the image content, it is possible for the image such as a text message to be displayed on the on-screen-display (OSD).

Further, the control unit 230 includes, for example, a function to control a brightness of light (backlight brightness) emitted from each light source of a backlight light source 410A for the left eye, and a function to control a brightness of light (backlight brightness) emitted from each light source of the backlight light source 410B for the right eye. In the present embodiment, the control unit 230 outputs a signal to control (control signal) to a backlight light source driver 630A for the left eye, by doing so, it controls the backlight brightness of the left eye side. Further, the control unit 230 outputs a signal to control (control signal) to the backlight light source driver 630B for the right eye, by doing so, it controls a backlight brightness of the right eye side.

Further, the control unit 230 includes a function to control the transmittance of a shade (in the present embodiment, transmittance of shade 420A for the left eye and shade 420B for the right eye). In the present embodiment, the control unit 230 outputs a signal to control (control signal) to a shade driver 640. By doing so, the transmittance of the shade is controlled.

Here, in the present embodiment, a shade 420A for the left eye and the shade 420B for the right eye are integrated as a body (shade unit 420), for both of these, the transmittance is controlled to the same value. However, as another configuration embodiment, in a case where the shade 420A for the left eye and the shade 420B for the right eye are separate bodies, for example, the control unit 230 may include a function to control the transmittance of the shade 420A for the left eye, and a function to control the transmittance of the shade 420B for the right eye as an independent function for each other.

More specifically, the control unit 230 uses a bit value signal corresponding to the desired transmittance of the shade as a control signal and outputs it to the shade driver 640. By doing so, the transmittance of the shade is controlled. Here, in the present embodiment, the storage unit 240 stores information of the correspondence between the transmittance of the shade and the bit value, and the control unit 230 uses the information by referring to the information of the correspondence between the transmittance of the shade and the bit value that are stored in the storage unit 240.

Figures 4, 5:
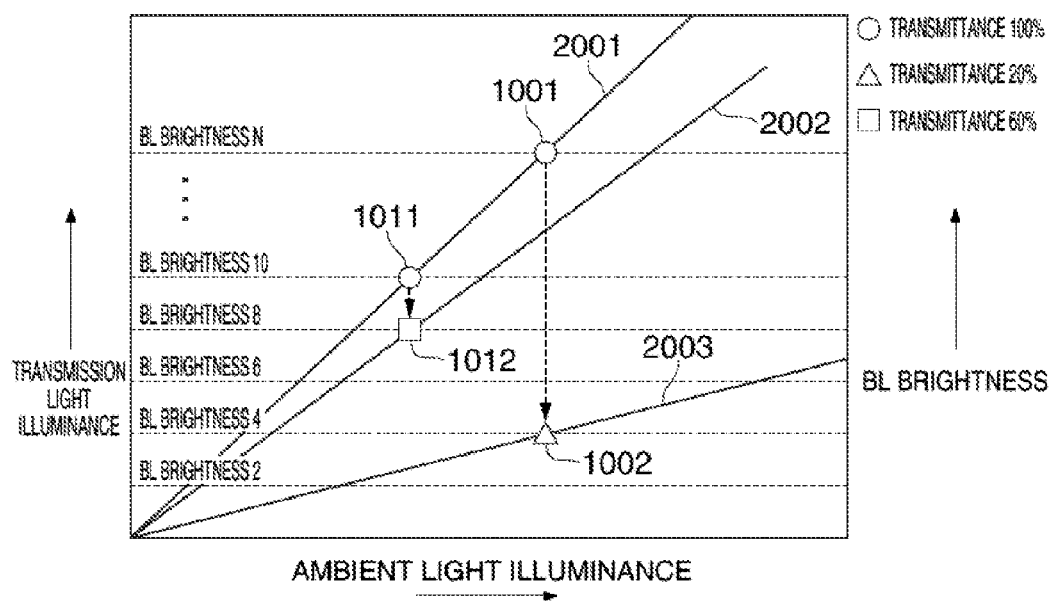
FIG. 4 is a diagram showing an example of correspondence between the transmittance of a shade and bit values according to the embodiment of the invention.
FIG. 5 is a diagram showing an example of relationship between backlight brightness and an ambient light illuminance and the transmission light illuminance of the shade according to the embodiment of the invention.

FIG. 4 is a diagram showing an exemplary correspondence between the transmittance of a shade and a bit value according to the embodiment of the invention. In this example, correspondence between some transmittance [%] value (for example, 0, 10, 20) and a bit value composed of four bits to achieve each transmittance value (for example, 0000,0001, 0010) is shown. In addition, the correspondence shown in FIG. 4 is an example, and various other things may be used.

Further, the control unit 230, for example, based on the detection result of level of the environmental light that is input from an ambient light sensor 650, and the detection result of level of the light (level of light after environmental light has passed a shade (shade 420B for the right eye in the present embodiment)) that is input from the transmission light sensor 660, calculates the actual transmittance of the shade (ratio of transmission light for environmental light), and can also verify whether or not the calculated transmittance is equal to (or close) a transmittance that has been tried to achieve by the control signal.

Further, the control unit 230 includes a function to control a gamma value ($\gamma$) of the image that is displayed on the left eye, and a function to control a gamma value ($\gamma$) of the image that is displayed on the right eye. In the present embodiment, the control unit 230, for example, corrects the image signal for the left eye, by doing so, it controls the gamma value of the image that is displayed on the right eye. Further, the control unit 230 corrects the image signal for the right eye, by doing so, it controls the gamma value of the image that is displayed on the right eye. Here, in the present embodiment, the gamma values of the images that are displayed both on the left eye and right eye are controlled in the same value. However, as another configuration example, a configuration for the independent control over each of the gamma value of the image to be displayed on the left eye and the gamma value of the image to be displayed on the right eye may be used.

In the present embodiment, the control unit 230, as an example of the predetermined determination method, based on a result in which a remaining capacity of a power supply is detected, in a case where the remaining capacity of the detected power supply is equal to or less than a predetermined threshold value, sets a backlight brightness fixedly in accordance with a brightness of an ambient light (environmental light), such that the control unit 230 controls the transmittance of the shade and the gamma value. In the present embodiment, such a control mode is referred to as the first mode. On the other hand, in the present embodiment, the control unit 230 controls as follows, as an example of the predetermined determination method, based on a result in which a remaining capacity of a power supply is detected. In a case where the remaining capacity of the detected power supply is larger than the predetermined threshold value, in accordance with a brightness of an ambient light (environmental light), the control unit 230 controls the transmittance of the shade, the backlight brightness and the gamma value. In the present embodiment, such a control mode is referred to as a second mode.

FIG. 5 is a diagram showing an exemplary relationship between backlight brightness (BL brightness), an ambient light illuminance and a transmission light illuminance of the shade according to the embodiment of the invention. In a graph shown in FIG. 5, a horizontal axis displays an ambient light illuminance, and a vertical axis displays a transmission illuminance of the shade. Further, in the graph, the vertical axis displays some BL brightness. In the example, BL brightness "i" (i=2, 4, 6, 8, 10, . . . N) represents the brightness magnitude of i-th step (N is integers greater than or equal to 11). In the example, when the "i" is large enough, it means a large brightness.

In the graph, as an example with a characteristic in which a transmittance of the shade is constant, the characteristic 2001 with 100% transmittance of shade, the characteristic 2002 with 60% transmittance of shade, and the characteristic 2003 with 20% transmittance of shade are shown. Further, in this graph, a value corresponding to respective BL brightness i in the vertical axis represents the appropriate transmission light illuminance with respect to the respective BL brightness i.

An example of control of the transmittance of the shade and the BL brightness performed by the control unit 230 is described. As the example of the control of the transmittance of the shade and the BL brightness performed by the control unit 230, when the ambient light illuminance is 10000 [1×], at a point 1001 where transmittance is 100% in the graph, the BL brightness N is suitable. In this regard, when the transmittance of the shade is set to 20%, a point 1002 where the transmittance is 20% in the graph is optimal, such that it is possible to enjoy an optimal video (image) at the BL brightness 4. In this case, when it is 6 for the BL brightness at the present time, the BL brightness is lowered to 4. By doing so, it is possible to reduce the power consumption.

As another example of the control over the transmittance of the shade and the BL brightness that are performed by the control unit 230, when the ambient light illuminance is 500 [1×], at a point 1011 where the transmittance is 100% in the graph, the BL brightness 10 is appropriate. According to this, when the transmittance of the shade is set to 60%, a point 1012 where the transmittance is 60% in the graph is optimal, such that it is possible to enjoy an optimal video (image) at the BL brightness 8. In this case, when it is 8 for the BL brightness at the present, just leave it as it is.

Figure 6:
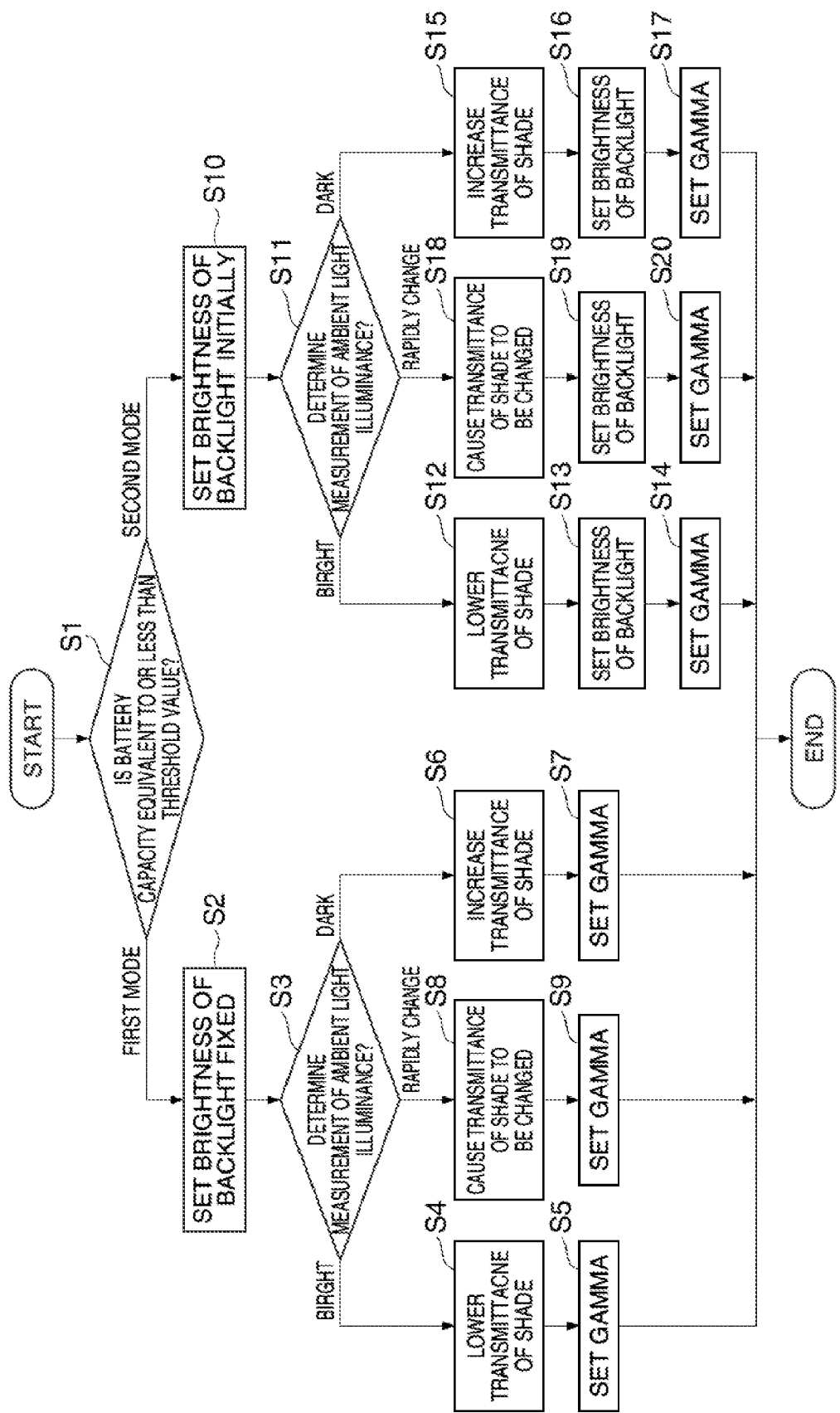
FIG. 6 is a flowchart showing an example of procedure of the process performed in the transmission type display device according to the embodiment of the invention.

An example of the operation that is performed in a transmission type display device according to the present embodiment will be described. FIG. 6 is a flowchart showing an exemplary procedure of the process performed in the transmission type display device according to the embodiment of the invention. The control unit 230 detects the remaining capacity (battery capacity) of the power supply unit 260, based on the remaining capacity of the detected power supply unit 260, by the predetermined determination method, in a case where the remaining capacity of the power supply unit 260 is determined to be small, the first mode is determined. In a case where the remaining capacity of the power supply unit 260 is determined to be large, the second mode is determined (step S1).

In the present embodiment, as an example of predetermined determination method mentioned above, the control unit 230, based on a result in which a remaining capacity (battery capacity) of a power supply unit 260 is detected, determines whether or not the detected battery capacity is equal to or less than a predetermined threshold value (step S1). Here, as the threshold value (threshold value related to battery capacity), an arbitrary value may be used, for example, the value when the remaining capacity of the power supply is reduced to a predetermined extent is used, as an example, it is possible to use a value in which the remaining capacity of the battery corresponds to 50%.

In addition, as a timing to perform the processing of the step S1 (processing of determination that is related to battery capacity), an arbitrary timing may be used. As an example, the processing of the step S1 (processing of determination that is related to battery capacity) can be performed at the timing when the power supply of the transmission type display device is switched to on-state from off-state according to the present embodiment. As another example, the processing of the step S1 (processing of determination that is related to battery capacity) can be performed repeatedly at the timing of certain predetermined period of time.

The present embodiment relates to a control over backlight brightness, as a first mode, uses a mode (backlight brightness fixing mode) to set a brightness of backlight as fixed. Further, as a second mode, the present embodiment uses a mode (backlight brightness control mode) to perform a control so as to set a brightness of backlight as variable.

As a result of determination in the processing of the step S1, the control unit 230, if the detected battery capacity is determined to be equal to or less than the predetermined threshold value, uses a mode (in the present embodiment, backlight brightness fixing mode corresponding to the first mode) in which the brightness of the backlight is set as fixed (step S2). Here, as the backlight brightness to be set as fixed in the backlight brightness fixing mode, an arbitrary value may be used, for example, a predetermined low brightness is used.

In the backlight brightness fixing mode, the control unit 230 performs a processing of step S3 to step S9. That is, the control unit 230 detects (measures) the ambient light illuminance, so as to be predetermined, with respect to the detection result of the ambient light illuminance, to be bright, to be dark, or to rapidly change is determined (step S3).

Here, in the control unit 230, as a method to detect an ambient light illuminance, various methods may be used. As an example, the control unit 230 uses, as a detection result of the ambient light illuminance, the detection result of a level of environmental light (for example, level of illuminance) that is input from the ambient light sensor 650. As another example, the control unit 230 uses, as a detection result of the ambient light illuminance, the detection result of a level of light (for example, level of illuminance) that is input from the transmission light sensor 660, and a value that is calculated from a transmittance of the shade. As an expression of the calculation, for example, {(detection result of environmental light level)=(detection result of transmission light level)/(transmittance of shade)} can be used.

Furthermore, as another example, the control unit 230 may use, as a detection result of the ambient light illuminance, a value that is determined based on a method (for example, expression of calculation) that is predetermined, from the detection result of a level of environmental light (for example, level of illuminance) that is input from the ambient light sensor 650, and the detection result of a level of light (for example, level of illuminance) that is input from the transmission light sensor 660. In addition, the control unit 230 may use, for example, in the predetermined period, the result acquired by averaging the detection result of the ambient light illuminance as a detection result of the ambient light illuminance.

Further, the control unit 230 may use various methods, with respect to the detection result of the ambient light illuminance, as a method to determine whether it is to be bright, or to be dark, or to be changed rapidly. In the present embodiment, a threshold value that is set for the ambient light illuminance is used. More specifically, in the present embodiment, the control unit 230, in a case where the value of the detection result of the ambient light illuminance exceeds the threshold value, determines to be bright, further, in a case where the value of detection result for the ambient light illuminance is equivalent or less than the threshold value, determines to be dark.

Here, as the threshold value (threshold value related to ambient light illuminance), an arbitrary value can be used. Further, the threshold value (value related to ambient light illuminance), for example, may be predetermined as fixed, or corresponding to a manipulation that is performed by a user, alternatively, the threshold value may also be automatically changed by the control unit 230 in a predetermined method.

Further, in the present embodiment, with respect to the detection result of an ambient light illuminance, the control unit 230 determines whether the detection result rapidly changes in the predetermined manner. Here, with respect to the detection result of the ambient light illuminance, as a method to determine whether or not the detection result rapidly changes, various methods may be used.

In the present embodiment, as an example, the control unit 230, in a predetermined period, in a case where the variation in the value of the detection result of the ambient light illuminance exceeds a predetermined threshold value, determines that the ambient light illuminance is rapidly changed. Here, as the period (period to determine the variation of the ambient light illuminance), an arbitrary period may be used. Further, as the threshold value (threshold value that is related to the variation of a value of the detection result of the ambient light illuminance), an arbitrary value may be used.

In the processing of step S3, as the result of determination, in a case where the detection result of an ambient light illuminance is that it is not rapidly changed but it is determined to be bright, the control unit 230 reduces the transmittance of the shade (step S4), the gamma value is set (step S5) in the predetermined manner.

Further, in the processing of step S3, as the result of determination, in a case where the detection result of an ambient light illuminance is that it is not rapidly changed, but it is determined to be dark, the control unit 230 increases the transmittance of the shade (step S6), and the gamma value is set (step S7) in the predetermined manner.

Further, in the processing of step S3, as the result of determination, in a case where the detection result of the ambient light illuminance is that it is rapidly changed, in accordance with the change, the control unit 230 causes the transmittance of a shade to be changed (step S8), and sets the gamma value in the predetermined manner (step S9).

Here, in the processing of step S4, step S6, and step S8, as a method of changing the transmittance of the shade, various methods may be used. As an example, as a method of changing the transmittance of the shade, a method to change (lower, or raise) the transmittance of the shade by only a predetermined quantity can be used. As another example, as a method of changing the transmittance of the shade, the correspondence to the difference between an ambient light illuminance or the ambient light illuminance and the threshold value thereof (threshold value related to ambient light illuminance) and a variation for the transmittance of the shade is stored in the storage unit 240, such that it is possible for the control unit 230 to use the method of using the variation for the transmittance of the shade corresponding to the difference between the ambient light illuminance or the ambient light illuminance and the threshold thereof (threshold value that is related to ambient light illuminance) by referring to the correspondence that is stored in the storage unit 240.

Further, in the processing of the step S5, the step S7, and the step S9, as a method to set a gamma value, various methods may be used. As an example, correspondence between at least one out of a backlight brightness, an ambient light illuminance, a transmittance of the shade or the like, and the gamma value (for example, gamma table) is stored in the storage unit 240, such that it is possible for the control unit 230 to use the method of setting the gamma value corresponding to at least one out of the backlight brightness, the ambient light illuminance, the transmittance of the shade or the like by referring to the correspondence that is stored in the storage unit 240. In addition, for example, a plurality of types of gamma tables are stored in the storage unit 240, as predetermined, the optimal value is acquired and used out of a plurality of types of gamma tables that are stored in the storage unit 240, such that it is possible for the control unit 230 to easily view the video.

As a result of determination in the processing of the step S1, the control unit 230, when the detected battery capacity is determined to exceed a predetermined threshold value, uses a mode (in the present embodiment, the backlight brightness control mode corresponding to the second mode) in which the brightness of the backlight is controlled so as to set the illuminance of the backlight as variable. Therefore, the control unit 230 performs initial setting on the brightness of the backlight (step S10).

Here, as the backlight brightness that is set initially in the backlight brightness control mode, an arbitrary value may be used, for example, a predetermined value may be set as fixed, or, as predetermined, a value corresponding to at least one of the transmittance of the shade or the like may also be set. As an example, as the backlight brightness that is initially set in the backlight brightness control mode, it is possible to use the optimal backlight brightness at the standard room illuminance.

In the backlight brightness control mode, the control unit 230 performs processing of step the S11 to the step S20. That is, the control unit 230 detects (measures) an ambient light illuminance, as predetermined, with respect to the detected result of the ambient light illuminance, and determines whether it is bright, dark, or changing rapidly (step S11).

Here, in the control unit 230, as a method to detect the ambient light illuminance, various methods may be used. In addition, with respect to this, for example, the same method with the case in processing the step S3 can be used. Further, as a method of determining whether it is bright, dark, or changing rapidly with respect to the detection of the ambient light illuminance, the control unit 230 may use various methods. In addition, with respect to this, for example, the same method with the case in the processing the step S3 can be used.

As a result of determination in the processing of step S11, in a case where the detection result of the ambient light illuminance is that it is not rapidly changed, but it is determined to be bright, the control unit 230 lowers a transmittance of shade as predetermined (step S12), sets the backlight brightness (step S13), and sets the gamma value (step S14).

Further, as the result of determination in the processing of the step S11, in a case where the detection result of the ambient light illuminance is that it is not rapidly changed, but it is determined to be dark, the control unit 230 raises the transmittance of the shade (step S15), sets the backlight brightness (step S16), and sets the gamma value (step S17) as predetermined manner.

Further, as the result of determination in the processing of the step S11, in a case where the detection result of the ambient light illuminance is that it is determined to be rapidly changed, in accordance with the change, the control unit 230 causes the transmittance of the shade to be changed (step S18), sets the backlight brightness (step S19), and sets the gamma value (step S20) as predetermined.

Here, in the processing of the step S12 to the step S13, the step S15 to the step S16, and the step S18 to the step S19, as a method of setting the transmittance of the shade and the backlight brightness, various methods may be used. As an example, as a method of setting the transmittance of the shade and the backlight brightness, as described with reference to FIG. 5, the control unit 230 can use the method of setting the transmittance of the shade and the backlight brightness as predetermined.

More specifically, the appropriate correspondence of the transmittance of the shade and the backlight brightness (for example, correspondence table) is stored in the storage unit 240. Therefore, the control unit 230 causes the transmittance of the shade to be changed, and sets the appropriate backlight brightness combined to the transmittance of the shade after the change based on the correspondence that is stored in the storage unit 240.

In this case, as an example, as a method of changing the transmittance of the shade, it is possible to use the method that causes the transmittance of the shade to be changed (lower, or raise) by only a predetermined quantity (for example, stepwise). As another example, as a method of changing the transmittance of the shade, the correspondence between the ambient light illuminance or a difference between an ambient light illuminance and a threshold thereof (threshold that is related to ambient light illuminance), and a variation for the transmittance of the shade is stored in the storage unit 240, such that it is possible for the control unit 230 to use the method of using the variation for the transmittance of the shade corresponding to the difference between the ambient light illuminance or the ambient light illuminance and the threshold thereof (threshold that is related to ambient light illuminance) by referring to the correspondence that is stored in the storage unit 240.

As another specific example, the appropriate correspondence of the transmittance of the shade and the backlight brightness (for example, correspondence table) is stored in the storage unit 240. Therefore, based on the correspondence that is stored in the storage unit 240, the control unit 230 can cause the backlight brightness to be changed, and can set the appropriate transmittance of the shade combined to backlight brightness after the change.

In this case, as an example, as a method of setting the backlight brightness, it is possible to use the method that causes the backlight brightness to be changed (lower, or raise) by only a predetermined quantity (for example, stepwise). As another example, as a method of setting the backlight brightness, the correspondence between an ambient light illuminance or a difference between an ambient light illuminance and a threshold thereof (threshold that is related to ambient light illuminance), and a variation for the backlight brightness is stored in the storage unit 240, such that it is possible for the control unit 230 to use the method of using the variation for the backlight brightness corresponding to the difference between the ambient light illuminance or the ambient light illuminance and the threshold thereof (threshold that is related to ambient light illuminance) by referring to the correspondence that is stored in the storage unit 240.

Further, in the processing of the step S14, the step S17, and the step S20, as a method to set the gamma value, various methods may also be used. As an example, the correspondence between at least one out of the backlight brightness, the ambient light illuminance, transmittance of the shade or the like and the gamma value (for example, gamma table) is stored in the storage unit 240, such that it is possible for the control unit 230 to use the method of setting the gamma value corresponding to at least one out of the backlight brightness, the ambient light illuminance, the transmittance of the shade or the like by referring to the correspondence that is stored in the storage unit 240. In addition, for example, a plurality of types of gamma tables are stored in the storage unit 240, as predetermined, the optimal value is acquired and used out of a plurality of types of gamma tables that are stored in the storage unit 240, such that it is possible for the control unit 230 to easily view the video.

Here, for example, in the processing of the step S1 to step S2, in a case where it is determined for the control unit 230 to use the backlight brightness fixing mode, it is possible to have a configuration performing a processing of the step S3 to step S9 repeatedly for predetermined period of time. Further, the maximum period for performing the processing of the step S3 to step S9 repeatedly is predetermined, when the maximum period has elapsed, it is also possible for the control unit 230 to have configuration of causing the backlight brightness fixing mode to be terminated.

In the same manner, for example, in the processing of step S1 and step S10, in a case where the control unit 230 determines to use a backlight brightness control mode, it is also possible to have a configuration performing the processing of the step S11 to the step S20 repeatedly for the predetermined period of time. Further, the maximum period for performing the processing of the step S11 to the step S20 repeatedly is predetermined, when the maximum period has elapsed, it is also possible for the control unit 230 to have configuration of causing the backlight brightness fixing mode to be terminated.

Further, the value used for each processing (for example, threshold and period) is stored in the storage unit 240, and used by being readout from the storage unit 240 by the control unit 230 in the present embodiment. In the present embodiment, in the processing of the step S1, as an example of the predetermined determination method, the control unit 230 shows a configuration determining the processing mode (in the present embodiment, backlight brightness fixing mode, backlight brightness control mode) based on whether the remaining capacity (battery capacity) of the power supply unit 260 is equivalent or less than the threshold value. However, as another example, it is also possible to use the configuration that determines the processing mode in accordance with the instruction that the manipulation unit 210 or the manipulation button unit 250 is manipulated and input by the user. In this case, as an indication, for example, the instruction is used, which shows to the user that the remaining capacity (battery capacity) of the power supply unit 260 is not small, or the remaining capacity (battery capacity) of the power supply unit 260 is large.

Further, in the present embodiment, in the processing of the step S3 to the step S11, it has been determined whether or not the ambient light illuminance rapidly changes. However, as another example, without determining whether or not the ambient light illuminance rapidly changes, the configuration to determine whether the ambient light illuminance is bright or dark may be used. Further, in the present embodiment, in a case where the ambient light illuminance is determined to be bright, determined to be dark, and determined to be changed rapidly, the configuration is shown that a control is performed on the respective cases. However, as another example, it is also possible to use a configuration in which control is only performed on any one or two out of these cases.

Further, in the present embodiment, the processing of the step S3 and the step S11, in a case where the value of the detection result on the ambient light illuminance exceeds a threshold value, the control unit 230 shows the configuration that determines it to be bright, further, in a case where the value of the detection result for the ambient light illuminance is equivalent or less than the threshold value, it shows a configuration that determines it to be dark. However, the other configuration may be used. As an example of the other configuration, in a case where the value of the detection result on the ambient light illuminance exceeds the first threshold value, the control unit 230 may use the configuration determined to be bright, further, in a case where the value of the detection result on the ambient light illuminance is equal to or less than a second threshold value (smaller value than first threshold value), and the configuration determined to be dark. In this case, in a case where the value of the detection result of the ambient light illuminance exceeds the second threshold value when the value of the detection result on the ambient light illuminance is equal to or less than a first threshold value, for example, the control unit 230 does not perform any of control.

Further, in the processing of the step S3 and step S11, in a case where the ambient light illuminance rapidly changes (in a case where the degree of the illuminance variation of the outside is large), for example, it is considered that the user with the display device 100 is walking, or riding on a vehicle such as cars, and views the outside. In a case where the ambient light illuminance changes rapidly, for example, in the processing of the step S8 to the step S9, the upper limit is set on the speed (for example, sampling frequency of the ambient light illuminance that is referenced for the control) to change the transmittance of the shade and the gamma value, such that the variation thereof is not noticed by the user as much as possible. In the same manner, in a case where the ambient light illuminance changes rapidly, for example, in the processing of the step S18 to the step S20, the upper limit is set on the speed (for example, sampling frequency of the ambient light illuminance that is referenced for the control) to change the transmittance of the shade, the backlight brightness, and the gamma value, such that the variation thereof is not noticed by the user as much as possible.

In this manner, in the example of operation shown in FIG. 6, the backlight brightness fixing mode (example of first mode) reduces the power consumption by fixing the backlight brightness to a low value, and changes the transmittance of the shade and the gamma value, in such a manner that it (the backlight brightness fixing mode) corresponds to the ambient light illuminance. On the other hand, the backlight brightness control mode (example of second mode) controls the transmittance of the shade, the backlight brightness and the gamma value, and reduces the power consumption, in such a manner that it (the backlight brightness control mode) corresponds to the ambient light illuminance.

Here, in the example of operation shown in FIG. 6, the value of the backlight brightness is used as an example of value (light intensity determination value) to determine a light output intensity of the image formed by an image light forming device (in the present embodiment, image formation unit 10A for the left eye, image formation unit 10B for the right eye), the value of light intensity for the organic EL (Electroluminescence) itself is not controlled, in such a manner that the backlight brightness is controlled. With this configuration, the configuration using the backlight brightness fixing mode that fixes the backlight brightness, and the backlight brightness control mode that does not fix but controls the backlight brightness is shown. However, instead of the value of backlight brightness, as the value (light intensity determination value) to determine the light output intensity of the image formed by the image light forming device (in the present embodiment, image formation unit 10A for the left eye, image formation unit 10B for the right eye), the other value may be used. As an example, as the other value of the light intensity determination value, the light intensity value for the organic EL (Electroluminescence) itself can be used. In this case, instead of the backlight brightness fixing mode according to the present embodiment, the mode to fix the light intensity for the organic EL itself is used, further, instead of the backlight brightness control mode according to the present embodiment, the mode to control without fixing the light intensity for the organic EL itself is used.

Further, in the present embodiment, there is provided a configuration that includes the ambient light sensor 650 to detect the environmental light level and the transmission light sensor 660 to detect the transmission light level. However, as another configuration example, instead of the transmission light sensor 660, it is possible to use a configuration having a sensor such as a camera for imaging the eyes of the user (one or both of the left eye and the right eye) with only certain number at the arbitrary position. In this case, as the state of the eye of the user, the control unit 230 includes the function to detect (determine) the size of the pupil of the eyes for the user based on the image that captures the eyes (left eye, right eye) of the user. The detection of the size of the pupil may be performed by the arbitrary image processing, for example, and can be realized by making use of the known image processing. Usually, in the human eye, when the human sees a dark thing (low illuminance), the size of the pupil becomes larger, when the human sees a bright thing (large illuminance), the size of the pupil becomes smaller. In view of this, for example, in a case where the value of the detection result for the size of the pupil exceeds the first threshold value that is related to the size of the pupil, the control unit 230 may use the configuration determined to be dark, further, in a case where the value of the detection result for the size of the pupil is equal to or less than the second threshold that is related to the size of the pupil (the same value with the first threshold value that is related to the size of the pupil, or the smaller value than the first threshold value), and the configuration determined to be bright. In this case, the control unit 230, in a case where the value of the detection result of the size of the pupil exceeds the second threshold value in the state of being equal to or less than the first threshold value, for example, does not perform any of control. In such a configuration, for example, it is possible to use by considering sensor such as a camera for detecting the size of the pupil of the eyes for the user to be the same as the transmission light sensor.

As above, in the present embodiment, in the display device (transmission type display device) of see-through type that causes the light from the outside to be transmitted to the image extraction area of the reflection unit, the shade (shade 420A for the left eye, shade 420B for the right eye) capable of adjusting percentage of the transmitted light (transmittance) with respect to the ambient light (environmental light) is provided, in accordance with the remaining amount of power or the like (for example, battery capacity), a mode that fixes a value (in the example of FIG. 6, backlight brightness value) that determines output intensity of the image light that is formed by the image light forming device (in the present embodiment, image formation unit 10A for the left eye, image formation unit 10B for the right eye) (first mode example) and a mode that controls the value as variable (second mode example) are used. Therefore, in the transmission type display device according to the present embodiment, in the mode that fixes the value, corresponding to the ambient light level (for example, illuminance), the transmittance of the shade, and the gamma value are controlled, further, in the mode controlling the value, corresponding to the ambient light level (for example, illuminance), the transmittance of the shade, the value (in the example of FIG. 6, backlight brightness value) and gamma value are controlled.

Here, in the transmission type display device, by the ambient light level (for example, illuminance), the appearance of video (image) can vary greatly. According to the transmission type display device according to the present embodiment, in order to adjust the ambient light that is input to the eyes of the user, the ambient light level is understood, the ambient light level is combined, the amount of incoming ambient light (transmittance of shade) such as a blind is electrically changed, in such a manner that the appearance of optimal image (clarity of image) is ensured, in accordance with the backlight brightness or the like, always under all the environmental light. In this manner, in the transmission type display device according to the present embodiment, for example, with the consideration of the remaining power (for example, battery capacity), the backlight brightness or the like, the ambient level (transmittance of shade) coming into the eyes of the user is optimized, such that it is possible to maintain the state to watch the image with ease at all times. Further, in the transmission type display device according to the present embodiment, the appearance of optimal image is realized, by doing so, for example, it is possible to reduce the power consumption without performing unnecessary increase on the brightness of the image.

In this manner, in the transmission type display device according to the present embodiment, along with low power consumption, it is possible for the user to watch the most optimized clarity video under all the environmental light. More specifically, in the transmission type display device according to the present embodiment, by the combination of the control of the light source brightness (in the present embodiment, the backlight brightness) and the control of the transmittance of the shade (shade 420A for the left eye, shade 420B for the right eye), an image quality (for example, color), can be optimized, further, it is possible to reduce the power consumption. In this manner, in the transmission type display device according to the present embodiment, it is possible to extend the life of the power supply and, to improve the image quality of video displayed.

For example, in the past, in the transmission type display device using the shade having a predetermined transmittance, irrespective of a dark or bright place, the transmittance of the shade is the same value. In this respect, with such a transmittance type display device, in the dark place, it's hard to know if the state of the outside is too dark, further, in the bright place, it is difficult to see the displayed video that has become thinner because it is bright outside, therefore, the strong point of see-through (transmission) has not been demonstrated. Further, in such a transmission type display device, for example, when the ambient light is dark, the video looks clean. However, since the backlight brightness is high in a useless manner, the power consumption is expected to be increased. With respect to this, the transmission type display device according to the present embodiment causes the transmittance of the shade to be changed in accordance with the ambient light level. As an example, when ambient light is bright, the video becomes thinner, such that the gamma value is adjusted. Further, when the ambient light is dark, the backlight brightness or the like is set to be optimal, such that it may be possible to reduce the power consumption.

BRIEF OF THE ABOVE DESCRIBED EMBODIMENTS

Here, the shade (shade 420A for the left eye, shade 420B for the right eye), for example, with respect to the display unit (display unit 110A for the left eye, display unit 110B for the right eye) may be provided as a body, or may be provided with a removable configuration.

Further, in the present embodiment as described above, a liquid crystal display (LCD) is used as the light modulation element 411A for the left eye and the light modulation element 411B for the right eye, and a backlight light source (backlight light source 410A for the left eye, backlight source 410B for the right eye) is used as a light source of the LCD. However, as another configuration example, as the light source of the LCD, a sidelight light source, or a front-light source can be used. Further, instead of the LCD, for example, laser scanning display device, or an organic EL display panel, or inorganic EL display panel can be used.

Further, the configuration units for left eye and right eye that are paired, for example, may also perform a same control over units for left and right eyes, or may perform a different control over units for the left and right eyes. Further, the configuration unit for the left eye and right eye that are paired, for example, may also perform a same control over units for both the right eye and left eye (same control or different control), or may perform a control over only one out of the left eye and the right eye.

Further, in the embodiment as above, the user manipulates the manipulation input unit 270 of the control device 200 (in the present embodiment, one or both of the manipulation unit 210 and the manipulation button unit 250). An example that the control unit 230 detects the manipulation input by doing so is shown. However, as another configuration example, a part or all of the manipulation input unit that receives the manipulation input from the user, for example, may be provided in the display device 100.

Further, in the embodiment above, the transmission type display device (transmission type display device for both eyes) having the configuration unit for both left eye and right eye is described as an example. However, as another configuration example, only one transmission type display device out of the left eye and the right eye (transmission type display device for one eye) may be applied.

Further, in the embodiment of the invention, for example, as light guide method, the reflection surface of a hologram may be applied to be used. Further, the embodiment of the invention, for example, without using the light guide plate, may also be applied to what simply causes an image light to be reflected at the reflection surface. Further, in the embodiment of the invention, for example, various known techniques may also be applied. As a specific example, the display device 100, as an optical system, may be provided with a pupil division method see-through optical system, or may be provided with a semi-transmission mirror method see-through optical system. Further, as a specific example, the display device 100, as an optical system, may also include an optical system including an image display device that is described in the JP-A-2008-20770, an optical system including the head mounted display that is described in the Japanese Patent No. 4636164, an optical system provided with the beam scanning type display unit that is described in the WO2009/041055, or an optical system provided with the display device that is described in the Japanese Patent No. 4055283.

Figure 7:
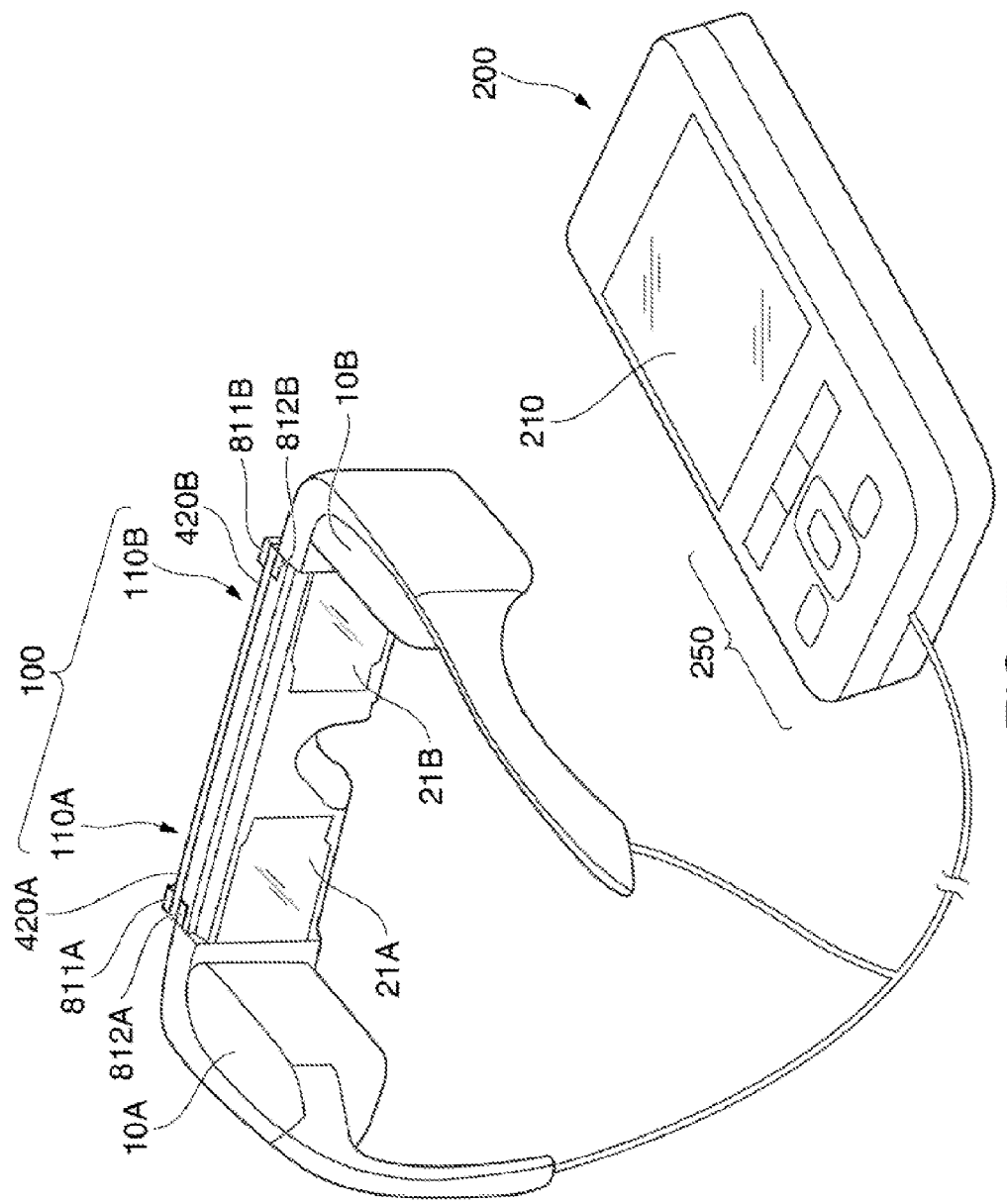
FIG. 7 is a diagram showing the appearance of a transmission type display device according to the embodiment of the invention.

A description will be given on the modification of the transmission type display device according to the embodiment of the invention with reference to FIGS. 7 to 12. FIG. 7 is a diagram showing the appearance of the transmission type display device according to the embodiment of the invention. In the transmission type display device shown in FIG. 7, in the display device 100, an ambient light sensor 811A for the left eye and a transmission light sensor 812A for the left eye are provided on the left eye side, an ambient light sensor 811B for the right eye and the transmission light sensor 812B for the right eye are provided on the right eye side.

In addition, as another configuration example, in the display device 100 of the transmission type display device shown in FIG. 7, while the ambient light sensor 811A for the left eye and the transmission light sensor 812A for the left eye are provided on the left eye side, on the right eye side, the configuration can be provided that does not include such sensors (ambient light sensor 811B for the right eye and transmission light sensor 812B for the right eye).

Figure 8:
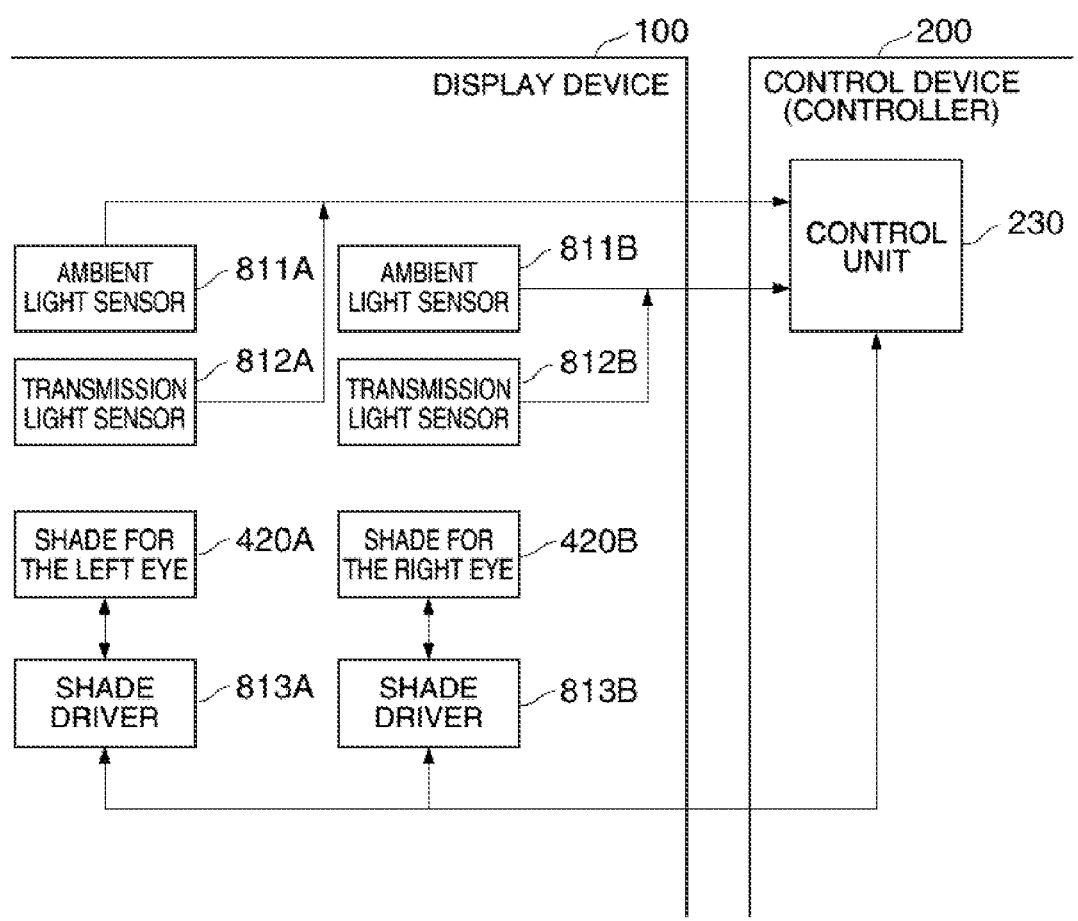
FIG. 8 is a block diagram schematically showing a configuration example of a part of the transmission type display device according to the embodiment of the invention.

FIG. 8 is a block diagram schematically showing a configuration example of a part of the transmission type display device according to the embodiment of the invention. In addition, FIG. 8 relates to the display device 100 and the control device 200, describes only configuration unit according to a modification. Another configuration unit (configuration unit other than the configuration unit according to modification), which relates to the display device 100 and the control device 200 shown in FIG. 8, is the same as what is shown in FIG. 3. The display device 100 includes the ambient light sensor 811A for the left eye, the transmission light sensor 812A for the left eye, the ambient light sensor 811B for the right eye, the transmission light sensor 812B for the right eye, the shade 420A for the left eye, the shade 420B for the right eye, the shade driver 813A for the left eye, and the shade drive 813B for the right eye.

In the configuration shown in FIG. 8, the ambient light sensor 811A for the left eye, the transmission light sensor 812A for the left eye, the ambient light sensor 811B for the right eye, and the transmission light sensor 812B for the right eye, respectively transmit the detected result of the light level that is the detection object to the control unit 230 of the control device 200. Therefore, the control unit 230 of the control device 200 includes a function corresponding to both sensors of these left and right (ambient light sensor 811A for the left eye, transmission light sensor 812A for the left eye, ambient light sensor 811B for the right eye, and transmission light sensor 812B for the right eye).

In the configuration shown in FIG. 8, the shade driver 813A for the left eye controlled by the control unit 230 of the control device 200 controls the shade 420A for the left eye. Further, the shade driver 813B for the right eye is controlled by the control unit 230 of the control device 200, and controls the shade 420B for the right eye. Therefore, the control unit 230 of the control device 200 includes function corresponding to both shade drivers of these left and right eyes (shade driver 813A for the left eye, shade driver 813B for the right eye).

Figure 9:
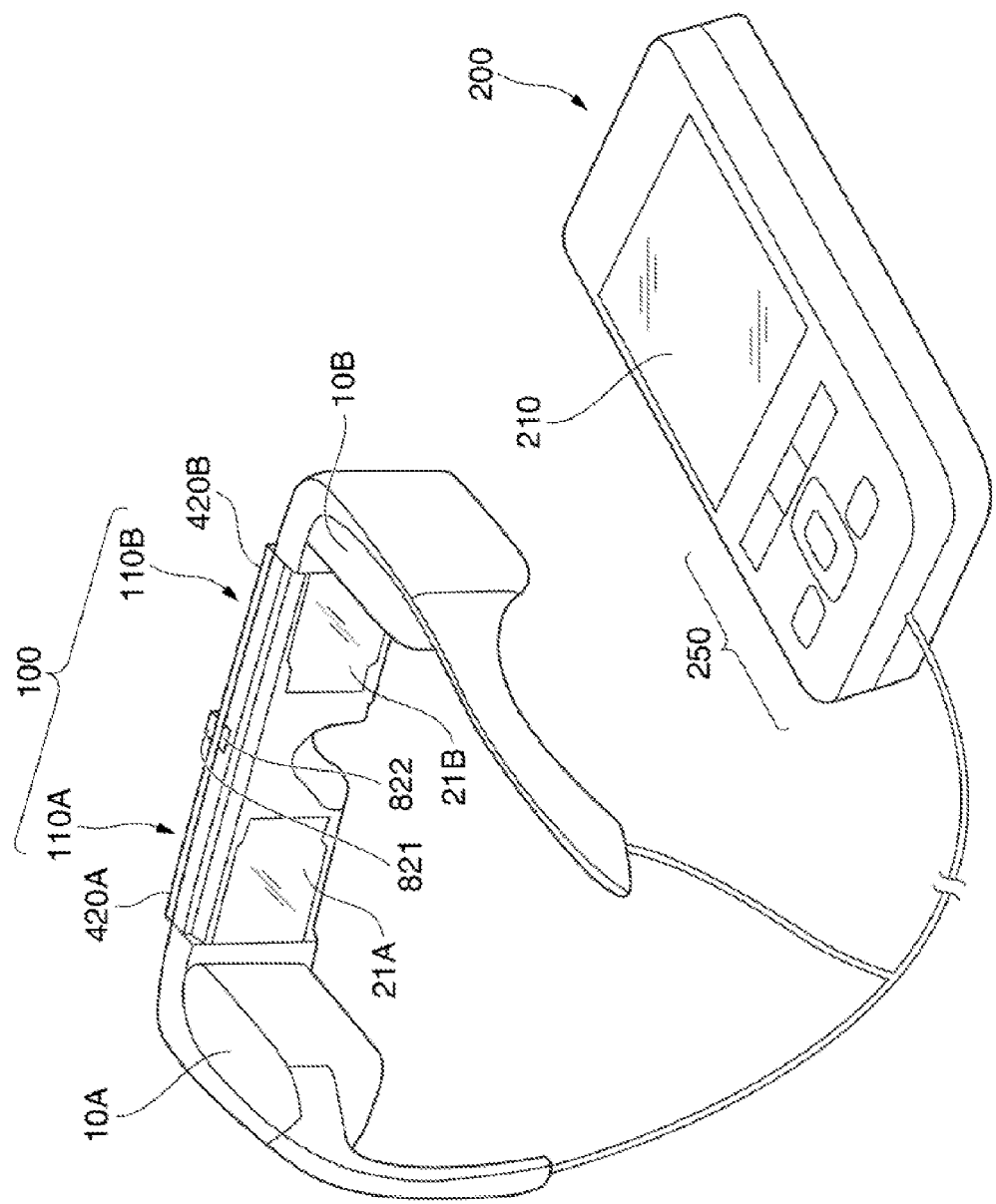
FIG. 9 is a diagram of the appearance of a transmission type display device according to the embodiment of the invention.

FIG. 9 is a diagram showing the appearance of the transmission type display device according to the embodiment of the invention. In the transmission type display device shown in FIG. 9, the display device 100 includes the ambient light sensor 821 common to both the left eye and the right eye, and the transmission light sensor 822 common to both the left eye and the right eye in the vicinity of the middle of the right and left of the shade unit 420 (shade 420A for the left eye and shade 420B for the right eye).

Figure 10:
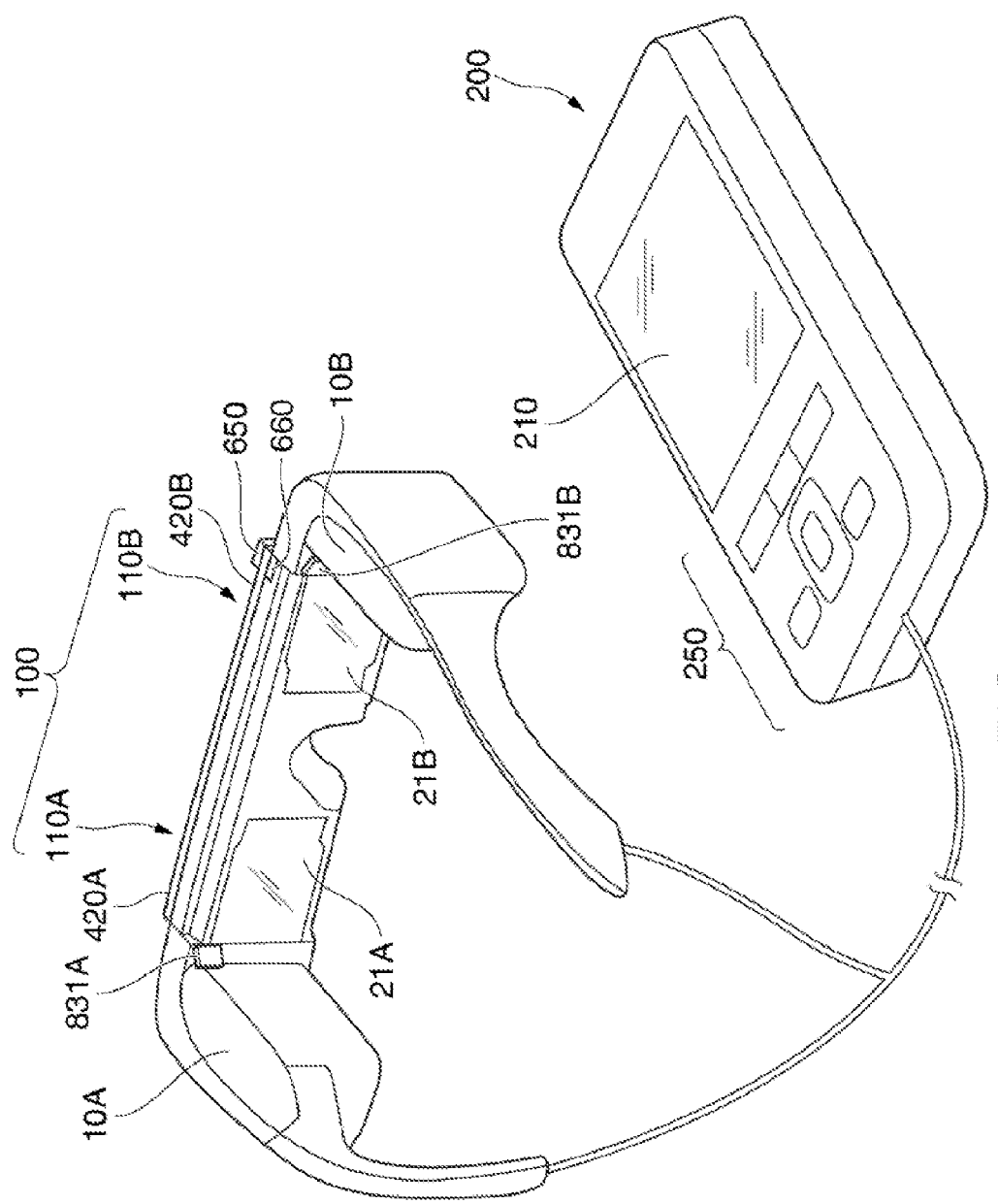
FIG. 10 is a diagram showing the appearance of a transmission type display device according to the embodiment of the invention.

FIG. 10 is a diagram showing the appearance of the transmission type display device according to the embodiment of the invention. In the transmission type display device shown in FIG. 10, the display device 100 arranges a camera 831A for the left eye to the position of the upper left for the image extraction area of the reflection unit 21A for the left eye, facing in the direction for imaging the left eye 310A of the user (position that is assumed to come). In the configuration, the camera 831A for the left eye captures the left eye 310A of the user (position that is assumed to come), transmits the captured image (for example, moving image) as a detection result in the state of the left eye 310A of the user to the control unit 230 of the control device 200. Here, the camera 831A for the left eye, in the state of the user mounting the display device 100, detects the state of the left eye 310A of the user. In addition, as a camera 831A for the left eye, for example, it is possible to use the camera of the CCD (Charge Coupled Device).

In the transmission type display unit shown in FIG. 10, the display device 100 arranges a camera 831B for the right eye to the position of the top right for the image extraction area of the reflection unit 21B for the right eye, facing in the direction for imaging the right eye of the user (position that is assumed to come). In the configuration, the camera 831B for the right eye captures the right eye (position that is assumed to come) of the user, transmits the captured image (for example, moving image) as a detection result in the state of the right eye of the user to the control unit 230 of the control device 200. Here, the camera 831B for the right eye, in the state of the user mounting the display device 100, detects the state of the right eye of the user. In addition, as a camera 831B for the right eye, for example, it is possible to use the camera of the CCD (Charge Coupled Device).

Figure 11:
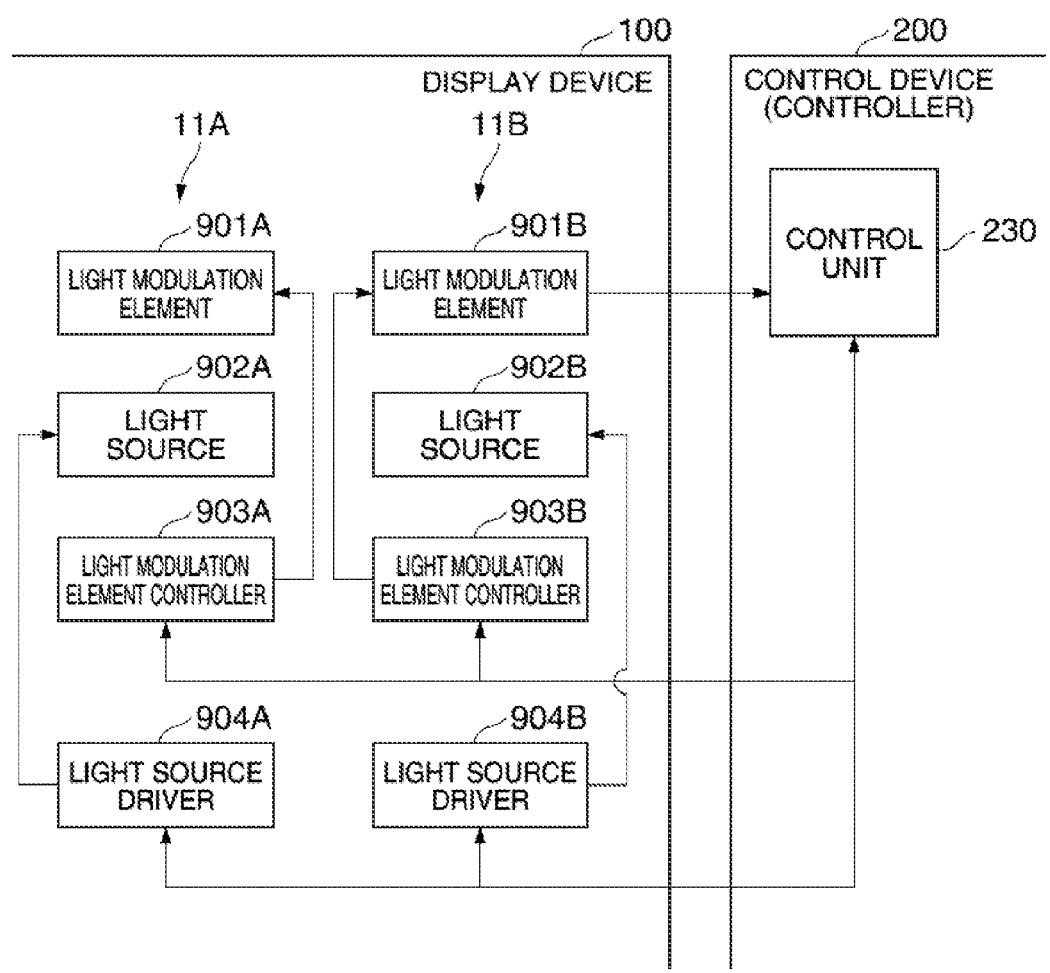
FIG. 11 is a block diagram schematically showing a configuration example of a part of the transmission type display device according to the embodiment of the invention.

FIG. 11 is a block diagram schematically showing a configuration example of a part of the transmission type display device according to the embodiment of the invention. In addition, FIG. 11, which relates to the display device 100 and the control device 200, describes only configuration unit according to a modification. Relating to the display device 100 and the control device 200 that are shown in FIG. 11, other configuration unit (configuration unit other than configuration unit according to a modification) is the same as what is shown in FIG. 3. The display device 100 includes a light modulation element 901A for the left eye, a light modulation element 901B for the right eye, a light source 902A for the left eye, a light source 902B for the right eye, a light modulation element controller 903A for the left eye, a light modulation element controller 903B for the right eye, a light source driver 904A for the left eye, and a light source driver 904B for the right eye.

In the configuration shown in FIG. 11, the light modulation element controller 903A for the left eye is controlled by the control unit 230 of the control device 200, and controls the light modulation element 901A for the left eye. Further, the light modulation element controller 903B for the right eye is controlled by the control unit 230 of the control device 200, and controls the light modulation element 901B for the right eye. Therefore, the control unit 230 of the control device 200 includes a function corresponding to both of these left and right light modulation element controllers (light modulation element controller 903A for the left eye, light modulation element controller 903B for the right eye).

In the configuration shown in FIG. 11, the light source driver 904A for the left eye is controlled by the control unit 230 of the control device 200, and controls the light source 902A for the left eye. Further, the light source driver 904B for the right eye is controlled by the control unit 230 of the control device 200, and controls the light source 902B for the right eye. Therefore, the control unit 230 of the control device 200 includes a function corresponding to both of these left and right light source drivers (light source driver 904A for the left eye, light source drive 904B for the right eye).

Here, as the light source (light source 902A for the left eye, light source 902B for the right eye), an arbitrary light source may be used, for example, other than the backlight light source, a sidelight light source, or front-light light source can be used. Further, as a light source driver (light source driver 904A for the left eye, light source driver 904B for the right eye), what corresponds to a light source (light source 902A for the left eye, light source 902B for the right eye) that is a control object is used.

Figure 12:
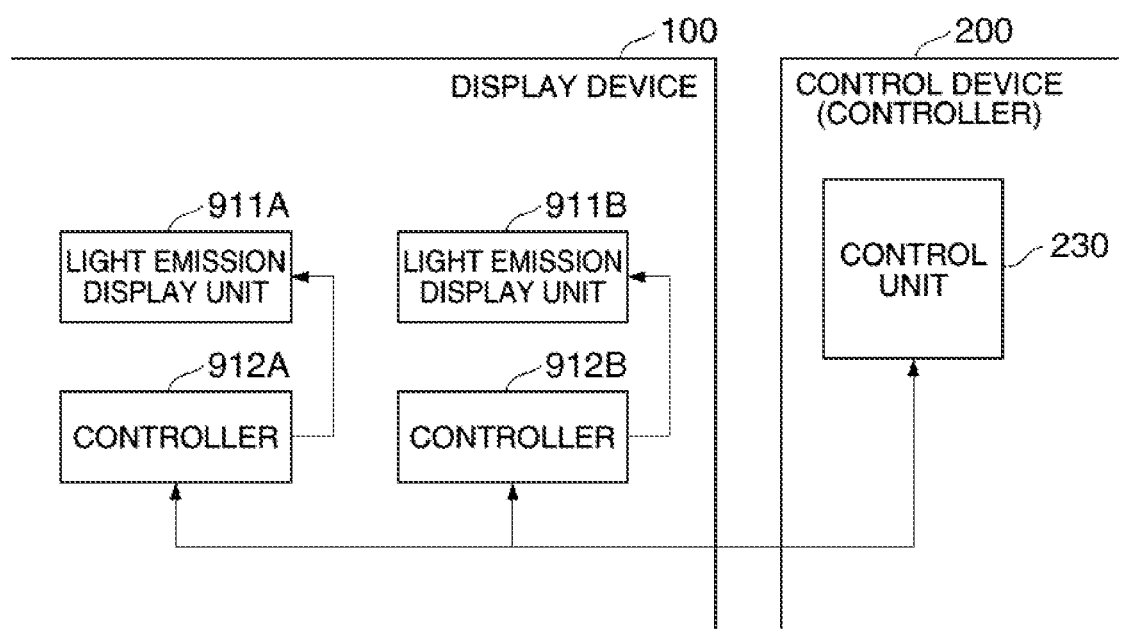
FIG. 12 is a block diagram schematically showing a configuration example of a part of the transmission type display device according to the embodiment of the invention.

FIG. 12 is a block diagram schematically showing a configuration example of a part of the transmission type display device according to the embodiment of the invention. In addition, FIG. 12, which relates to the display device 100 and the control device 200, describes only configuration unit according to a modification. Relating to the display device 100 and the control device 200 that are shown in FIG. 12, other configuration unit (configuration unit other than configuration unit according to a modification) is the same as what is shown in FIG. 3. The display device 100 includes a light emission display unit 911A for the left eye, a light emission display unit 911B for the right eye, a controller 912A for the left eye, a controller 912B for the right eye.

Here, as the light emission display unit (light emission display unit 911A for the left eye, light emission display unit 911B for the right eye), for example, as in the EL display panel, the display unit is used, which uses the substance that emits light when the voltage is applied.

In the configuration shown in FIG. 12, the controller 912A for the left eye is controlled by a control unit 230 of the control device 200, for example, so as to cause the image in accordance with an image signal for the left eye to be displayed, and controls the light emission display unit 911A for the left eye. The controller 912B for the right eye is controlled by a control unit 230 of the control device 200, for example, so as to cause the image in accordance with an image signal for the right eye to be displayed, and controls a light emission display unit 911B for the right eye. Therefore, the control unit 230 of the control device 200, for example, includes a function to control the controller 912A for the left eye to cause the image corresponding to the image signal for the left eye to be displayed, and a function to control the controller 912B for the right eye to cause the image corresponding to the image signal for the right eye to be displayed.

In addition, in the configuration shown in FIG. 12, for example, the display device 100 may not include a light source such as a backlight and, the driver of the light source.

As above, the embodiment of the invention is described in detail with reference to the drawings. However, the specific configuration is not limited to the embodiment, the designs or the like are included without departing from the scope of the invention.

In addition, there is provided a program for realizing the function of arbitrary configuration unit in the transmission type display device described above, which may be recorded in a computer readable recording media, and then it may be executed to cause the program to be readout to a computer system. Further, here, "computer system" includes OS (Operating System) and hardware such as a peripheral apparatus. Further, the "computer readable recording medium" is referred to as a portable medium such as flexible disk, a magneto-optical disk, a ROM (Read Only Memory), a CD (Compact Disk)-ROM, and storage medium such as hard disk that is built into the computer system. Furthermore, "computer readable recording medium" includes an object to keep the program for a predetermined time, such as a volatile memory (RAM: Random Access Memory) inside the computer system that becomes a server and a client in a case where the program is transmitted through a network such as an internet and a communication line such as a telephone line.

Further, the program described above may be transmitted, from the computer system that stores the program in the storage device or the like, through a transmission medium, or may be transmitted to other computer system by the transmission wave out of transmission medium. Here, "transmission medium" that transmits a program is referred to as a medium that includes a function that transmits information as a network (communication network) such as an internet and a communication line (communication line) such as a telephone line. Further, the program described above is to realize a part of function described previously. Furthermore, the program described above can be realized by making the function described previously in combination with a program already recorded in the computer system, and may be a so-called differential file (differential program).

The entire disclosure of Japanese Patent Application No. 2011-270965, filed Dec. 12, 2011 is expressly incorporated by reference herein.

What is claimed is:

1. A transmission type display device comprising:
an image formation unit that forms an image of image light being output to an image extraction area;
a display unit that transmits ambient light to an image extraction area, so as to output image light from the image formation unit to the image extraction area, and changes a light level of the ambient light with a transmittance that is set by a shade in which a transmittance of light is a variable so as to pass the light to the image extraction area;
an ambient light sensor that detects a level of the ambient light;
a transmission light sensor that detects a level of the transmitted light passing through the shade; and
a control unit that determines a first mode in which a light intensity determination value that is a value for determining a light intensity of an image formed by the image formation unit is fixed, and a second mode in which the light intensity determination value is variably set,
wherein in the first mode, the control unit fixes the light intensity determination value, and controls the transmittance of the shade based on a detection result by the ambient light sensor and the transmission light sensor, and
wherein in the second mode, the control unit variably sets the light intensity determination value, and controls the transmittance of the shade and the light intensity determination value based on a detection result by the ambient light sensor and the transmission light sensor.

2. The transmission type display device according to claim 1,
wherein the control unit detects a remaining capacity of power, and based on the detected remaining capacity of power, by a predetermined determination method, in a case where the remaining capacity of the power is determined to be small, the control unit determines the first mode, and in a case where the remaining capacity of the power is determined to be large, the control unit determines the second mode.

3. The transmission type display device according to claim 1, wherein the control unit further controls a gamma value in the first mode and the second mode.

4. The transmission type display device according to claim 1, wherein a value of light source brightness for a display element is used as a light intensity determination value that is a value for determining light intensity of an image formed by the image formation unit.

5. The transmission type display device according to claim 1,
wherein the display unit is provided to a display device mounted on a head of a user,
wherein the display unit includes a display element, a projection lens that projects an image light from the display element, and a light guide unit that guides the image light from the projection lens fixed to the projection lens to the image extraction area, and wherein the display unit is configured such that an image of the image light from the display element and an image of the ambient light can be observed at the same time through the light guide unit,
wherein the image formation unit includes the display element that generates the image, and a light source that emits the image light representing the image generated by the display element,
wherein the control unit optimizes the control of the light intensity determination value, by adjusting a brightness of the image formation unit to change the value of the light source brightness stepwise, changing the transmittance of the shade stepwise, and combining the control of the light source brightness and the control of the transmittance of the shade.

6. A display method of a transmission type display device, comprising:
forming an image of an image light output to an image extraction area by an image formation unit,
causing an ambient light to be transmitted to the image extraction area, along with outputting image light from the image formation unit to the image extraction area, causing light level from the outside to be changed with the transmittance of light that is set by shade in which transmittance of light is a variable, and causing the ambient light to be passed to the image extraction area by a display unit,
detecting a level of the ambient light,
detecting a level of the transmitted light passing through the shade,
determining a first mode in which a light intensity determination value that is a value determining light intensity of an image formed by the image formation unit is fixed, and a second mode in which the light intensity determination value is variably set by a control unit,
wherein in the first mode the light intensity determination value is fixed, and a transmittance of the shade is controlled based on a detection result of the ambient light and a detection result of the transmitted light passing through the shade, and
wherein in the second mode the light intensity determination value is variably set based on a detection result of the ambient light and a detection result of the transmitted light passing through the shade, and the transmittance of the shade is controlled based on a detection result of the ambient light and a detection result of the transmitted light passing through the shade.

7. A non-transitory, computer-readable storage medium that stores a computer-executable program for operating a transmission type display device which includes:
an image formation unit that forms an image of image light being output to an image extraction area;
a display unit that transmits ambient light to an image extraction area, so as to output image light from the image formation unit to the image extraction area, and changes a light level of the ambient light with a transmittance that is set by a shade in which a transmittance of light is a variable so as to pass the light to the image extraction area;
an ambient light sensor that detects a level of the ambient light; and
a transmission light sensor that detects a level of the transmitted light passing through the shade;
the program causing a computer to execute:
a procedure of determining a first mode in which a light intensity determination value that is a value determining light intensity of an image formed by the image formation unit is fixed, and a second mode in which the light intensity determination value is set as a variable by a control unit,
wherein in the first mode the light intensity determination value is fixed, and a transmittance of the shade is controlled based on a detection result by the ambient light sensor and the transmission light sensor, and
wherein in the second mode the light intensity determination value is variably set based on a detection result by the ambient light sensor and the transmission light sensor, and the transmittance of the shade is controlled based on a detection result by the ambient light sensor and the transmission light sensor.

* * * * *